United States Patent [19]

Simonyi

[11] Patent Number: 5,790,863

[45] Date of Patent: Aug. 4, 1998

[54] METHOD AND SYSTEM FOR GENERATING AND DISPLAYING A COMPUTER PROGRAM

[75] Inventor: Charles Simonyi, Medina, Wash.

[73] Assignee: Microsoft Corporation, Redmond, Wash.

[21] Appl. No.: 745,251

[22] Filed: Nov. 8, 1996

Related U.S. Application Data

[63] Continuation of Ser. No. 145,689, Oct. 29, 1993, abandoned.

[51] Int. Cl.$^6$ ........................................ G06F 15/46
[52] U.S. Cl. .................. 395/707; 395/500; 395/705; 395/702; 364/188; 364/192; 364/242.4
[58] Field of Search ............... 395/500, 700, 395/13, 315, 702, 703, 705, 709; 364/DIG. 1, DIG. 2, 188, 192, 242.4

[56] References Cited

U.S. PATENT DOCUMENTS

| | | | |
|---|---|---|---|
| 4,782,444 | 11/1988 | Munshi et al. | 364/300 |
| 4,827,404 | 5/1989 | Barstow et al. | 364/200 |
| 5,148,513 | 9/1992 | Koza et al. | 395/13 |
| 5,161,216 | 11/1992 | Reps et al. | 395/375 |
| 5,175,843 | 12/1992 | Casavant et al. | 395/500 |
| 5,191,646 | 3/1993 | Naito et al. | 395/161 |
| 5,327,561 | 7/1994 | Choi et al. | 395/700 |
| 5,343,554 | 8/1994 | Koza et al. | 395/13 |
| 5,408,603 | 4/1995 | Van de Lavoir et al. | 395/161 |

FOREIGN PATENT DOCUMENTS 0 546 794  6/1993  European Pat. Off. .

OTHER PUBLICATIONS

A New Tree Type Data Structure with Homogeneous Nodes Suitable for a very large spacial Database Yulaka Oshawa and Masao Sakauchi, 1990th International Conference, Data Engineering.

Pattern Matching in unordered Trees.Dennis Shash et al., Tools with Artificial Intellegence, 1992 Int'l Conf. IEEE.

Minor, S., "Interacting with structure–oriented editors," *Int. J. Man–Machine Studies*, 37:399–418, 1992.

Bahlke, R. and G. Snelting, "The PSG System: From Formal Language Definitions to Interactive Programming Environments," *ACM Transactions on Programming Languages and Systems*, vol. 8, No. 4, Oct. 1986, pp. 547–576.

Ballance, R. et al., "The Pan Language–Based Editing System for Integrated Development Environments," Sigsoft, Irvine, California, 1990, pp. 77–93.

Donzeau–Gouge, V. et al., "Programming Environments Based on Structure Editors: The MENTOR Experience," Institut National de Recherche en Informatique et Automatique Rocquencourt, France, pp. 128–140.

Shneiderman, B. et al., "Display Strategies for Program Browsing: Concepts and Experiment," *IEEE Software*, May 1986, pp. 7–15.

Dykes, L. and R. Cameron, "Towards high–level editing in syntax–based editors," *Software Engineering Journal*, Jul. 1990, pp. 237–244.

(List continued on next page.)

*Primary Examiner*—Lucien U. Toplu
*Assistant Examiner*—Majid A. Banankhah
*Attorney, Agent, or Firm*—Seed and Berry LLP

[57] ABSTRACT

A method and system for generating a computer program. In a preferred embodiment, the present invention provides a program tree editor for directly manipulating a program tree. A program tree comprises of plurality of nodes corresponding to computational constructs. The program tree editor receives commands from a user that are independent of a programming language syntax. The present invention also provides a display representation generator for generating a display representation of the program tree. The display representation generator retrieves nodes from the program tree and displays a display representation of the node. A user of the present invention preferably interacts with the program tree editor based on the display representation.

15 Claims, 18 Drawing Sheets

OTHER PUBLICATIONS

Garlan, D. and R. Miller, "GNOME: An Introductory Programming Environment Based on a Family of Structure editors," Proceedings of the ACM SIGSOFT/SIGPLAN Software Engineering Symposium on Practical Software Development Environments, Pittsburgh, Pennsylvania, Apr. 23–25, 1984.

Hood, R., "Efficient Abstractions for the Implementation of Structured Editors," *ACM*, Feb. 1985, pp. 171–178.

Kaiser, G. et al., "A Retrospective on DOSE: An Interpretive Approach to Structure Editor Generation," *Software –Practice and Experience*, vol. 18(8), Aug. 1988, pp. 733–148.

Merks, E. et al., "Language Design for Program Manipulation," *IEEE Transactions on Software Engineering*, vol. 18, No. 1, Jan. 1992, pp. 19–32.

Feather, Martin S., *A Survey and Classification of some Program Transformation Approaches and Techniques*, Elsevier Science Publishers B. V. (North–Holland), 1987, pp. 165–195.

Kotik, Gordon B. and Lawrence Z. Markosian, "Automating Software Analysis and Testing Using a Program Transformation System," *Proc. 14th Int'l Comp. Software and Applications Conference*, pp. 1–10, 1990.

Bassett, Paul G., "Frame–Based Software Engineering," *IEEE Software*, Jul. 1987, pp. 9–16.

Neighbors, James M., "The Evolution from Software Components to Domain Analysis," *Int. J. of Software Eng. and Knowledge Eng.*, vol. 2, No. 3, 1992, pp. 325–354.

"Guidelines for Software Refinery Language Models," Reasoning Systems, Palo Alto, California, May 2, 1991, 29 pages.

Garlan, David et al., "A Transformation Approach to Generating Application–Specific Environments," *ACM*, Dec. 1992, pp. 68–77.

Snelting, G., "Experiences with the PSG –Programming System Generator," Institut für Systemarchitektur, Technische Hochschule Darmstadt, 1985, pp. 148–162.

Teitelbaum, Tim, and Thomas Reps, "The Cornell Program Synthesizer: A Syntax–Directed Programming Environment," *Communications of the ACM*, vol. 24, No. 9, pp. 563–573, Sep., 1981.

Reps, Thomas and Tim Teitelbaum, "The Synthesizer Generator," *SIGPLAN Notices*, vol. 19, No. 5, pp. 42–48, 1984.

Habermann, A. Nico and David Notkin, "Gandalf: Software Development Environments," *IEEE Transactions on Software Engineering*, vol. SE–12, No. 12, pp. 1117–1127, 1986.

Reps, Thomas W. and Tim Teitelbaum, "The Synthesizer Generator Reference Manual," 3d ed., Springer–Verlag, N.Y., 1985, pp. 1–10, 54–85, and 90–111.

METHOD AND SYSTEM FOR GENERATING AND DISPLAYING A COMPUTER PROGRAM

CROSS-REFERENCE TO RELATED APPLICATION

This application is a file wrapper continuation of U.S. patent application Ser. No. 08/145,689, filed Oct. 29, 1993, now abandoned.

TECHNICAL FIELD

The present invention relates generally to a computer method and system for generating a computer program and, more specifically, to a computer method and system editing a program tree.

BACKGROUND OF THE INVENTION

Computer programs are generally written in a high-level programming language (e.g., Pascal and C). Compilers are then used to translate the instructions of the high-level programming language into machine instructions, which can be executed by a computer. The compilation process is generally divided into 6 phases:

1. Lexical analysis
2. Syntactic analysis
3. Semantic analysis
4. Intermediate code generation
5. Code optimization
6. Final code generation Lexical analysis involves scanning the computer program and recognizing components or tokens of the high-level language. During this phase, the compiler converts the computer program into a series of tokens that are processed during syntactic analysis. For example, during lexical analysis, the compiler would recognize the statement cTable=1.0;

as the variable (cTable), the operator(=), the constant (1.0), and a semicolon. A variable, operator, constant, and semicolon are tokens of the high-level language. During syntactic analysis, the compiler processes the tokens and generates a syntax tree to represent the program. A syntax tree is a tree structure in which operators are stored in non-leaf nodes and operands are stored in leaf nodes. In the above example, the operator ("=") has two operands: the variable (cTable) and the constant (1.0). During semantic analysis, the compiler modifies the syntax tree to ensure semantic correctness. For example, if the variable (cTable) is an integer and the constant (1.0) is real, then during semantic analysis an real to integer conversion would be added to the syntax tree. During intermediate code generation, code optimization, and final code generation, the compiler generates machine instructions to implement the program represented by the syntax tree. The machine instructions can then be executed by the computer.

SUMMARY OF INVENTION

The present invention provides a method and system for generating a computer program. In a preferred embodiment, the present invention provides a program tree editor for directly manipulating a program tree. A program tree comprises of plurality of nodes corresponding to computational constructs. The program tree editor receives commands from a user that are independent of a programming language syntax. The present invention also provides a display representation generator for generating a display representation of the program tree. The display representation generator retrieves nodes from the program tree and displays a display representation of the node. A user of the present invention preferably interacts with the program tree editor based on the displayed representation.

BRIEF DESCRIPTION OF DRAWINGS

FIG. 4 shows a C display representation of the sample program tree.

FIG. 5 shows a Lisp display representation of the sample program tree.

DETAILED DESCRIPTION OF THE INVENTION

The present invention provides a method and system for generating and maintaining a computer program. In a preferred embodiment, a software facility (the facility) represents a computer program as a program tree. A program tree is a tree structure in which non-leaf nodes represent operators and leaf nodes represent operands. The facility provides a mechanism for directly manipulating nodes, that is, adding, deleting, and moving nodes, within a program tree. Once a program tree is generated, then the steps of semantic analysis, intermediate code generation, code optimization, and final code generation are performed to effect the transformation of the computer program represented by the program tree into executable code.

The facility provides commands for selecting a portion of a program tree, for placing an insertion point in the program tree, and for selecting a type of node to insert at the insertion point. The facility allows various commands to be performed relative to the currently selected portion and the current insertion point. For example, the currently selected portion can be copied or cut to a clipboard. The contents of the clipboard can then be pasted from the clipboard to the current insertion point using a paste command. Also, the facility provides various commands (e.g., "Paste =") to insert new a node at the current insertion point.

The facility preferably displays the program tree to a programmer by generating a display representation of the program tree. A display representation format specifies the textual representation of each type of node that may be inserted in a program tree. The facility preferably supports display representation formats for several different popular programming languages, such as C, Pascal, Basic, and Lisp. This permits a programmer to select, and change at any time, the display representation format that the facility uses to produce a display representation of the program tree. For example, one programmer can select to view a particular program tree in a C display representation format, and another programmer can select to view the same program tree in a Lisp display representation format. Also, one programmer can switch between a C display representation format and a Lisp display representation format for a program tree.

The facility preferably indicates the currently selected portion of the program tree to a programmer by highlighting the corresponding display representation of the program tree. Similarly, the facility preferably indicates the current insertion point to a programmer by displaying an insertion point mark (e.g., "I" or "^") within the display representation. The facility also allows the programmer to select a new current portion or re-position the insertion point based on the display representation.

Figure 1:
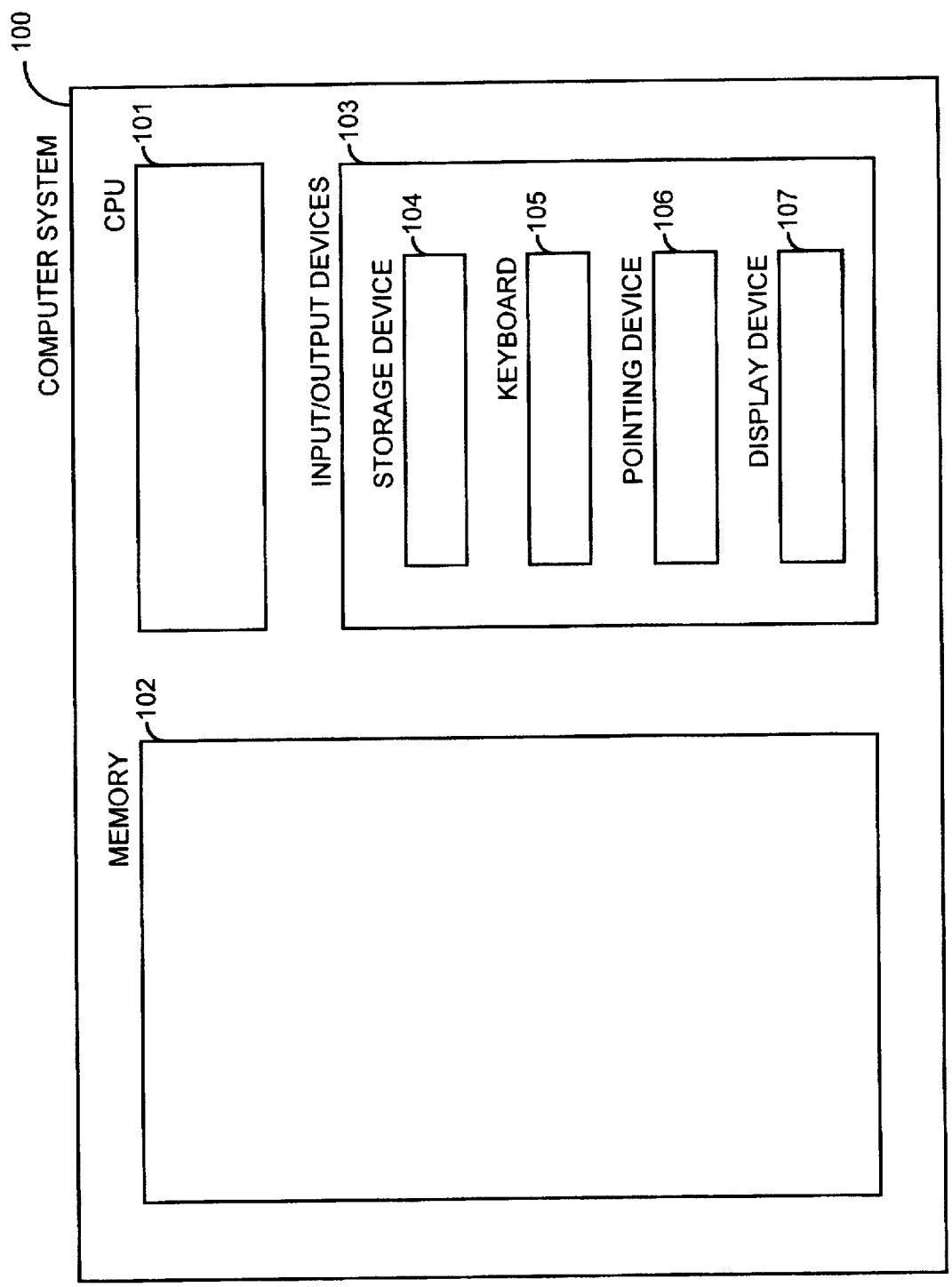
FIG. 1 is a high-level block diagram of the general-purpose computer system upon which the facility preferably operates.

FIG. 1 is a high-level block diagram of the general-purpose computer system upon which the facility preferably operates. The computer system 100 contains a central processing unit (CPU) 101, a computer memory (memory) 102, and input/output devices 103. The computer programs of the facility reside in the memory and execute on the CPU. Among the input/output devices is a storage device 104, such as a hard disk drive, a keyboard 105, a pointing device 106, such as a mouse, and a display device 107, such as a monitor.

Figure 2:
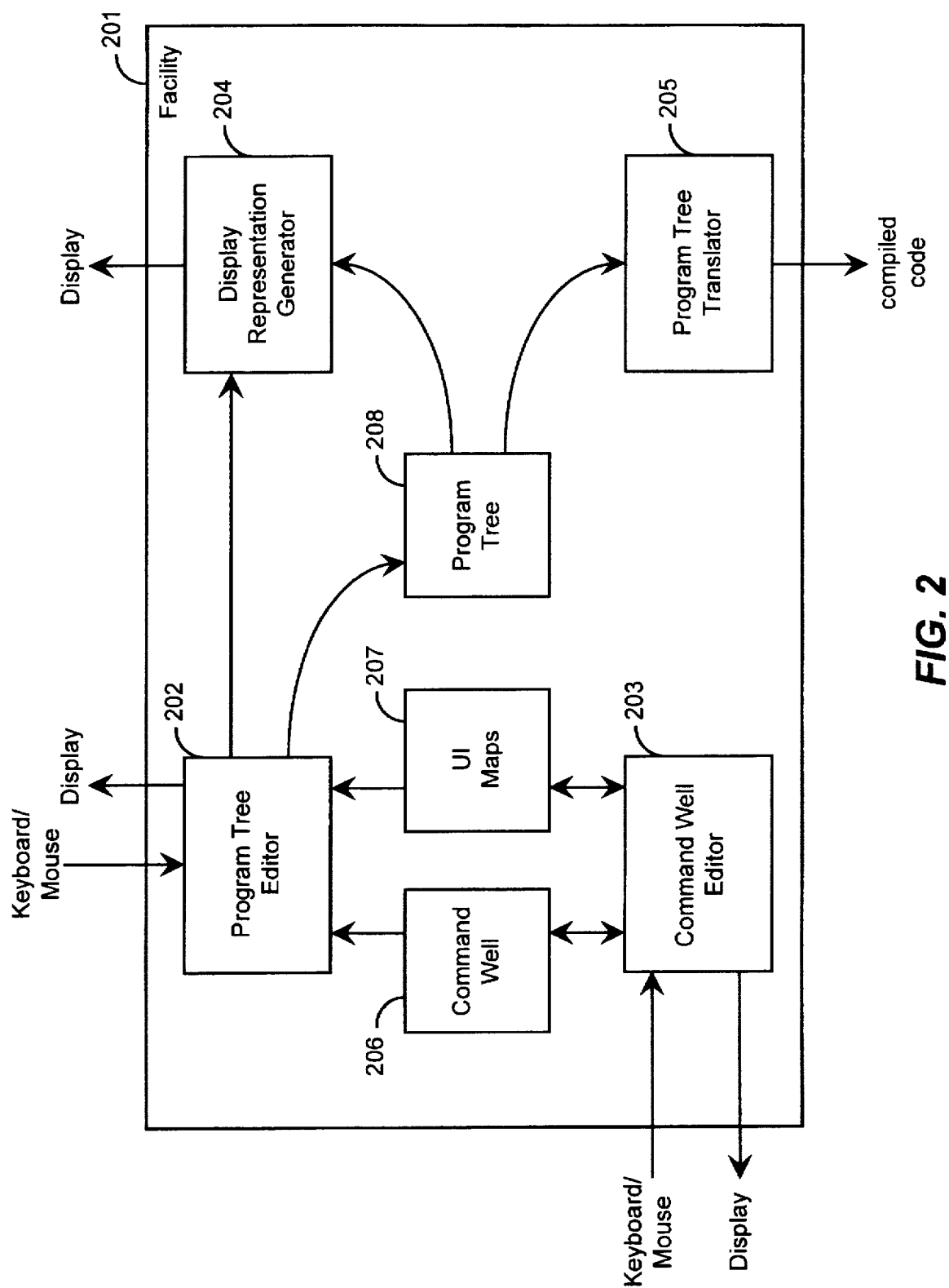
FIG. 2 is block diagram of components of the facility in a preferred embodiment.

FIG. 2 is block diagram of components of the facility in a preferred embodiment. The facility 201 includes program tree editor 202, command well editor 203, display representation generator 204, program tree transformer 205, command well 206, user interface maps 207, and program tree 208. The program tree editor controls the selection of the available commands directly from the command well or from the command well based on the user interface maps, and effects the execution of commands selected by a programmer. The user interface maps map menu items, toolbars, and keys to commands. When a menu item, toolbar, or key is selected, the program tree editor performs the associated command. The command well contains a list of commands that are available for programmer selection and code to effect the performance of each command. The command well editor allows a programmer to customize the user interface provided by the program tree editor. The display representation generator generates and displays a display representation of the program tree based on a programmer selected display representation format. The program tree transformer controls the transformation of the program tree to executable code.

THE PROGRAM TREE

Figure 3:
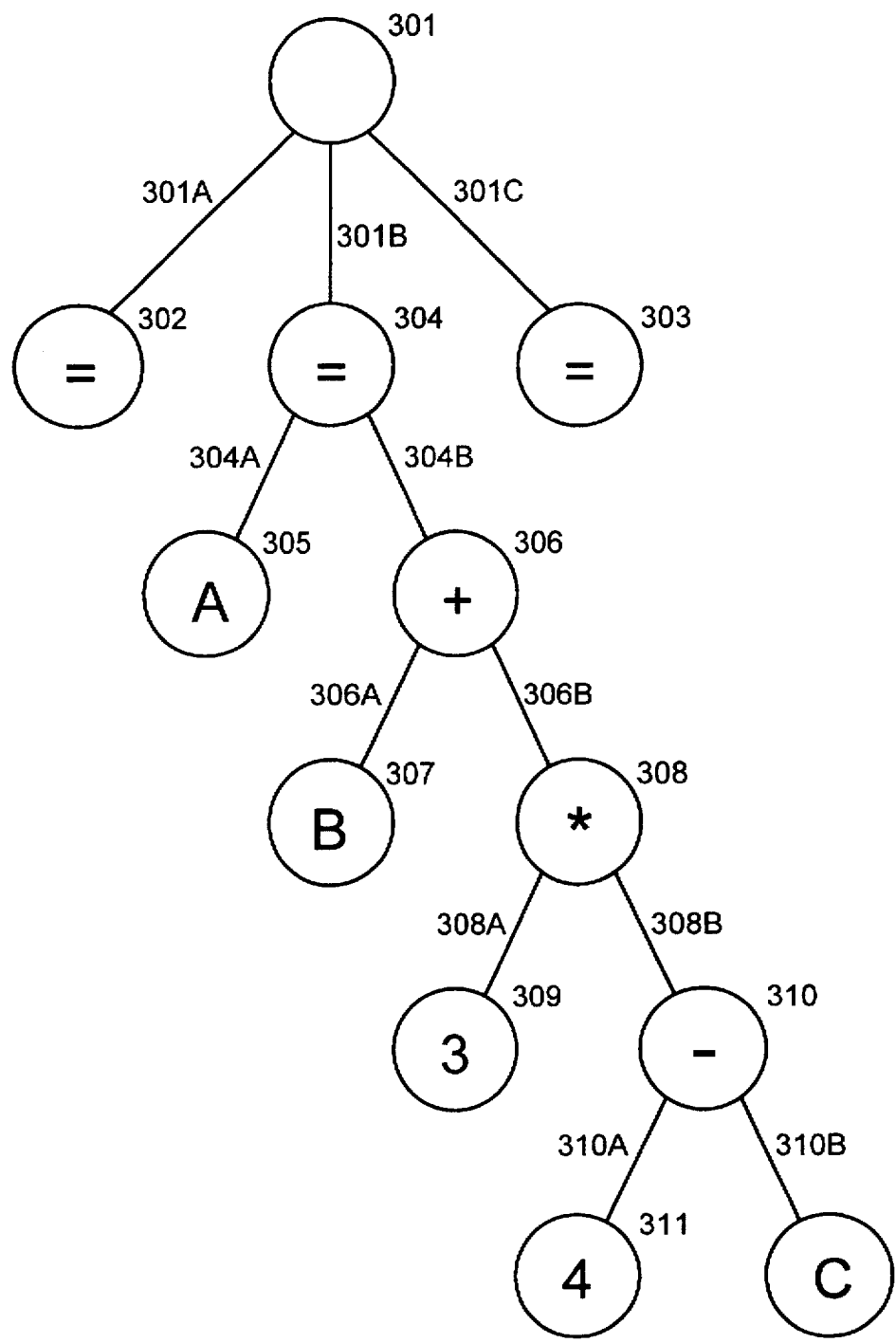
FIG. 3 is a diagram of a sample program tree.

FIG. 3 is a diagram of a sample program tree. This sample program tree corresponds to the following computer code:

```
{
  B = 4;
  A = B + 3 * (4 - C);
  D = A/2;
}
```

Figures 4, 5:
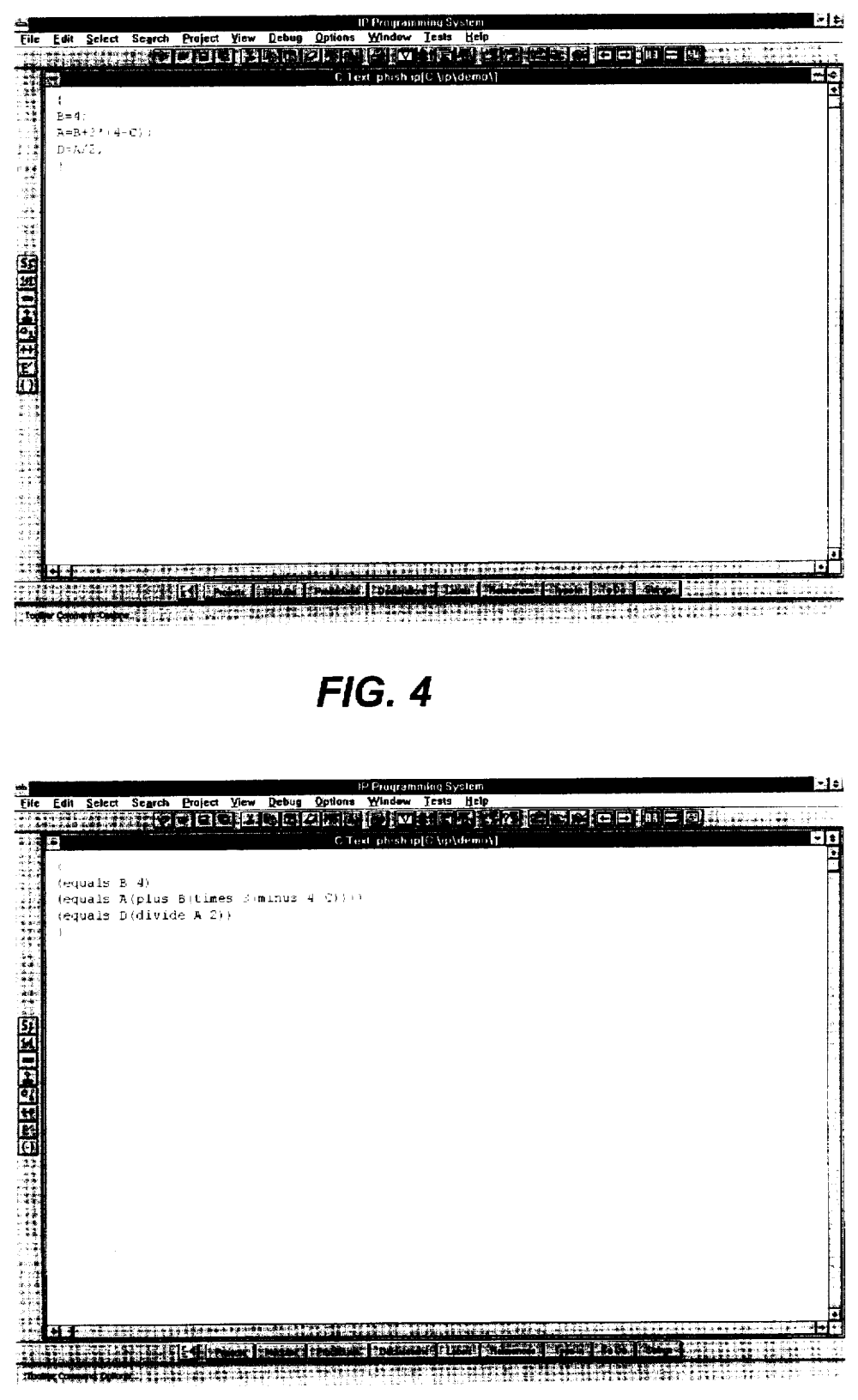

The sample program tree contains a node 302, 303, 304 for each statement of the computer code. The subtrees for statements 302 and 304 are not shown on FIG. 3. The subtree for the statement "A=B+3*(4-C)" comprises nodes 304 through 312. FIG. 4 shows a C display representation of the sample program tree. FIG. 5 shows a Lisp display representation of the sample program tree. The sample program tree may also be displayed in a tree display representation that is similar to the layout of FIG. 3.

A program tree is preferably stored in memory as a collection of nodes called tree elements (TEs). The facility maintains two different kinds of TEs: an expression (EXPR) and a declaration (DCL). Each TE has the following form: (operator, properties [i], operand [i]) where there may be zero or more operands and properties. The operator field and operand fields are pointers to other TEs. An expression is a kind of TE (EXPR TE) that represents an expression in the program tree. For example, an EXPR TE corresponding to a "+" operator, contains a pointer (operator) to a DCL TE that defines the operator and contains a pointer (operand [i]) to an EXPR TE for each operand. If an operand corresponds to a leaf node of the program tree, then the EXPR TE for the operand points to a DCL TE that defines the operand (e.g., the definition of a particular integer variable). The operand fields can point to DCL TEs or EXPR TEs. For example, in FIG. 3 node 306 is represented in memory as an EXPR TE the operator field points to the DCL TE for the "+" operator; one operand field points to an EXPR TE which points to the DCL TE for the "B" variable, and the other operand field points to the EXPR TE corresponding to node 308. In a preferred embodiment, a program tree includes predefined DCL TEs to describe typical computational constructs. The typical computational constructs include logical and arithmetic operators, constants, flow control (e.g., "for" construct), the assignment operator, and type definitions.

A declaration is a kind of TE (DCL TE) that represents the definition of an entity (e.g., a computational construct). Part of that definition consists of information describing the entity, such as its print name (e.g., "+"), the name space in which it occurs (e.g., module), its volatility (e.g., constant or variable) and various other flags, which are preferably stored as properties. In addition, a declaration usually has one or two children: its type and its initial value. These children define the type and the value of the entity by pointing to DCL TEs that specify the type and the value. Because EXPR TEs point to the declaration for their operator on operand, the properties of declarations can be changed and be immediately reflected throughout the program tree. For example, if a particular variable is highlighted, then a property of the declaration for the variable is set to highlight. Because each EXPR TE corresponding to that variable points to the DCL TE for the variable, the highlight property is easily accessible when processing the program tree.

Because each EXPR TE for an operator or an operand corresponding to a leaf node contains a pointer to a DCL TE, the names of (a property of) each DCL TE may be arbitrarily assigned. The names are preferably used for display only. Moreover, each DCL TE does not need a unique name. A DCL TE can be identified to a user by a non-unique name and other properties of the DCL TE or its location (e.g., containing module name) of the DCL TE. In this way, a variable with the same name as field of a structure can be distinguished. Also, operands can be associated with declarations without the constraints of scoping rules normally associated with typical programming languages. For example, code from different libraries can be combined without causing name conflicts.

In a preferred embodiment, each DCL TE has corresponding function (method) for displaying the operator or operand described by the declaration. As discussed below in detail, the display representation generator invokes this function when generating a display corresponding to an EXPR TE. The EXPR TE points to the DCL TE. Thus, when a property of a DCL TE is changed that affects the display representation, the change is reflected when the display representation is next generated.

A list is a kind of TE (List TE) that represents collections. There are many kinds of lists including those that list the modules of a project, the fields of a structure, the fields of a union, the declarations in a statement block, the formal parameters of a procedure, and the statements in a compound statement. Lists may have zero or more children.

Property lists are used to set various attributes of a TE. For example, a TE may contain style properties to specify the display characteristics (e.g., color and font). Properties may also be inherited from other TEs. For example, a style property for an EXPR TE may be inherited from a DCL TE pointed to by the operator field.

All of these pointer interconnections form a graph of arbitrary complexity. However, even though these connections form a general graph, a subset of the connections form an program tree. Further, the program tree is a spanning tree that lends itself to a natural or canonical order for traversal and processing of all of the TEs in the program tree.

The root of a program tree is a List TE. The declaration tree entries (DCL TEs) of the root list correspond to modules, which comprise a project. A project corresponds to a computer program.

THE PROGRAM TREE EDITOR

The program tree editor provides commands for creating and modifying program trees. A program tree is generated by entering a sequence of editor commands that create and insert nodes (tree elements) into the program tree. For example, a programmer adds an assignment statement to a compound statement by selecting a node for the compound statement, indicating that a child node is to be added with the assignment operator ("=").

The program tree editor provides the user interface of FIG. 4. The program tree editor directs the display representation generator to display a representation of the program tree on the display device. The program tree editor also effects the performance of commands invoked from the command well, from a menu, from a toolbar, or from a keymap. Commands typically manipulate (add and delete nodes) the program tree, change the insertion point, or change the current selection. Other commands allow for storing and retrieving the program tree. The program tree editor user interface preferably includes a menu 401, a horizontal toolbar 402, a vertical toolbar 403, a program text area 404, and a left margin area 405 as shown in FIG. 4.

Figure 6:
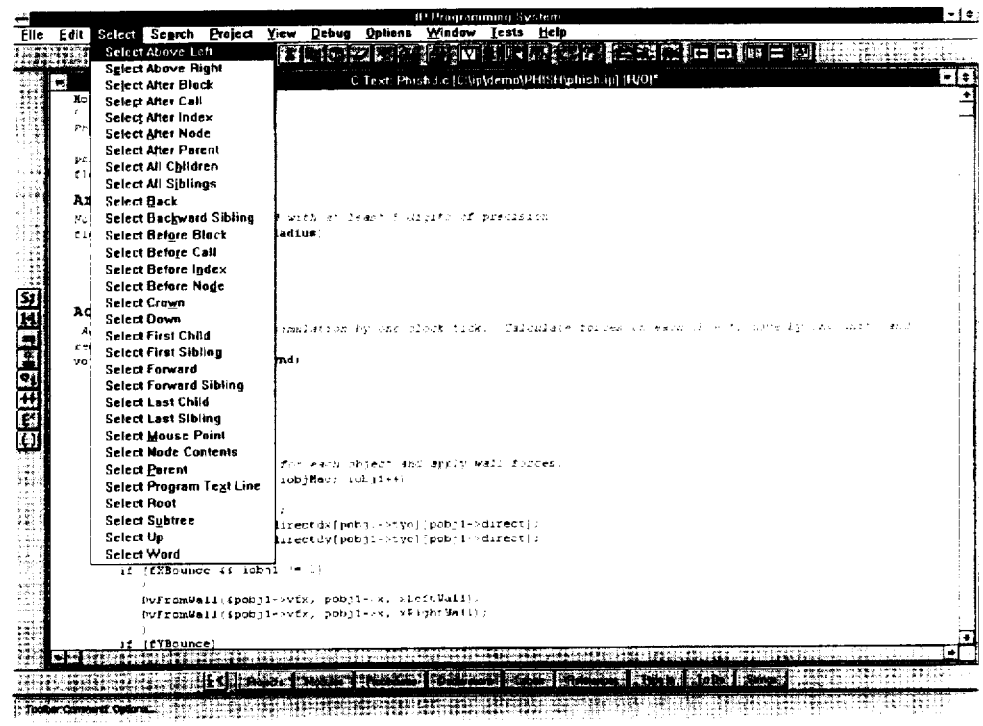
FIG. 6 illustrates the selection of the select menu of the program tree editor.

FIG. 6 illustrates the selection of the select menu of the program tree editor. The select menu is a pull down menu that lists various commands for selecting portions of the program tree and positioning the insertion point.

In one embodiment, the program tree editor includes a tokenizer for receiving keyboard entered text, recognizing a token, and converting the token into a sequence of editor commands. The program tree editor provides commands for selecting portions of an program tree, and for placing an insertion point in the program tree. The program tree editor allows various commands to be performed relative to the currently selected portion and the current insertion point. For example, the "Paste if" command replaces the currently selected portion of the program tree by an expression node pointing to the DCL that defines the computational construct for conditional execution, which is generally denoted as "if" in current computer language syntax. The typing of an "if" token results in the corresponding, "Paste if" command being executed relative to the selection.

The program tree editor provides various commands for selecting portions, positioning insertion points, adding and deleting nodes in the program tree, and manipulating the program tree. As described below, the command well editor allows a programmer to customize the mapping of keys to commands. The following describes a typical user interface for manipulating a program tree.

A subtree is selected by pointing to the display representation of some tree node and the left (mouse button) double clicking. The entire subtree headed by that node is selected. A list of subtrees may be selected by drawing through the list with a mouse button held down. Selection and placement of the insertion point can be effected by a single command. A single click will select a subtree, but it positions the insertion point at one end of the selection—depending on whether the click was in the left or the right half of the display representation of the node. Although the subtree is selected, the subtree may not be modified. Rather, the selection defines an operand of the operator to be inserted at the insertion point. If the operator is binary, the selected subtree will be the right or the left operand of the operator, depending on the placement of the insertion point. Missing operands are displayed as "???". Alt-click selects the head of a subtree, without highlighting the whole subtree. This permits replacing an operator, while leaving the operands in place.

The following is a description of various selecting and insertion point positioning commands:

SELECT NODE select a particular node. To specify this command, the programmer positions the mouse pointer over a token of the displayed program and clicks the mouse. For example, when the programmer selects the "=" of the statement "A=B+3*(4−C)", then the program tree editor selects the node 304. In the following, the selected portion of the program tree is indicated by an underline. The following illustrates the selection of a node.

A=B+3*(4−C)

position mouse pointer over "="

command: select node

A=B+3*(4−C)

SELECT SUBTREE select the entire subtree of the currently selected node. For example, when the currently selected portion is node 304 and the programmer enters the select subtree command, then the program tree editor selects the subtree comprising nodes 304–312. The following illustrates the select subtree command.

A=B+3*(4−C)

command: select subtree

A=B+3*(4−C)

SELECT CROWN select only the head node of the currently selected subtree. For example, when the currently selected portion is the subtree with the nodes 304–312 and the programmer enters the select crown command, then the program editor selects node 304. The following illustrates the select crown node of subtree command.

A=B+3*(4–C)
command:select crown
A=B+3*(4–C)

SELECT PARENT selects only the parent node of the currently selected subtree or, alternatively, if only a single node is currently selected, then its parent node is selected. For example, when the currently selected portion is the subtree with nodes 304–312 and the programmer enters the select parent command, then the program tree editor selects the node 301. The following illustrates the select parent of head node command.

```
{
B = 4
A = B + 3 * (4 – C)
D = A/2
}
command: select parent
{
B = 4
A = B + 3 * (4 – C)
D = A/2
}
```

SELECT FIRST CHILD selects the first child node of the head node of the currently selected subtree or currently selected node. For example, when the currently selected portion is the subtree with nodes 304–312, and the programmer enters the select first child command, then the program tree editor selects the node 305. The following illustrates the select first child command A=B+3*(4–C)
command: select first child
A=B+3*(4–C)

SELECT LAST CHILD selects the last child node of the head node of the currently selected subtree or currently selected node. For example, when the currently selected portion is the subtree with nodes 304–312 and the programmer enters the select last child of head node command, the program tree editor selects the node 306. The following illustrates the select last child command.

A=B+3*(4–C)
command: select last child
A=B+3*(4–C)

SELECT PREDECESSOR SIBLING selects the predecessor sibling node of the head node of the currently selected subtree or currently selected node. For example, when the currently selected portion is the subtree with nodes 304–312 and the programmer enters the select predecessor sibling command, then the program tree editor selects the node 302. In an alternate embodiment, if a subtree is currently selected, then the program tree editor selects the entire sibling subtree. The following illustrates the select predecessor sibling command.

```
{
B = 4
A = B + 3 * (4 – C)
D = A/2
}
command: select predecessor sibling
{
B = 4
A = B + 3 * (4 – C)
D = A/2
}
```

SELECT SUCCESSOR SIBLING selects the successor sibling node of the head node of the currently selected subtree or currently selected node. For example, when the currently selected portion is the subtree with nodes 304–312 and the programmer enters the select successor sibling command, then the program editor selects the node 303. In an alternate embodiment, if a subtree is currently selected, then the program editor selects the entire sibling subtree. The following illustrates the select successor sibling command.

```
{
B = 4
A = B + 3 * (4 – C)
D = A/2
}
command: select successor sibling
{
B = 4
A = B + 3 * (4 – C)
D = A/2
}
```

SELECT NEXT "???"

selects the next node in program tree that is undefined (described below) as encountered in a depth first left-to-right traversal of the program tree.

SELECT ABOVE LEFT places the insertion point above the currently selected subtree or node. When a node for a multi-operand operator is inserted, new operand nodes are inserted on the left of the currently selected node. The command is preferably selected by positioning the mouse pointer to the left of the currently selected portion and clicking the mouse. For example, when the currently selected portion is the subtree with nodes 308–312 and the insertion point is above the current node to the left, then the program editor inserts the new node above and to the left of the currently selected subtree. The following illustrates placing the insertion point ("|") above the currently selected node to the left.

A=B+3*(4–C)
A=B+E ??? 3*(4–C)
A=B+E+(3*(4–C))

Note that the selection "3*(4–C)" defined the right operand of the inserted binary operator "+". Parenthesis are displayed by the display representation generator to illustrate the operator precedence.

SELECT ABOVE RIGHT places the insertion point above the currently selected subtree node. When a node for a multi-operand operator is inserted, new operand nodes are inserted on the right of the currently selected node. The command is preferably by positioning the mouse pointer to the right of the currently selected node and clicking the mouse. For example, when the currently selected portion is the subtree with nodes 308–312 and the insertion point is above the current node to the right, then the program tree editor inserts the new node above and to the right of the currently selected subtree. The following illustrates placing the insertion point above the currently selected node to the right.

A=B+3*(4−C)
A=B+3*(4−C)|
A=B+3*(4−C)+E

Note that the selection "3*(4−C)" defined the left operand of the inserted binary operator "+".

SELECT BEFORE NODE places the insertion point as a left sibling of the currently selected node or subtree. The command is preferably selected by positioning the mouse pointer to the left of the currently selected subtree and clicking the mouse. For example, when the currently selected portion is the subtree with nodes 304–312 and the programmer places the insertion point as a left sibling, then the program editor inserts subsequently pasted nodes between nodes 302 and 304. The following illustrates the select before node command.

```
{
  B = 4
>
  A = B + 3 * (4 − C)
  D = A/2
}
new data: C = 2
{
  B = 4
  C = 2
>
  A = B + 3 * (4 − C)
  D = A/2
}
```

SELECT AFTER NODE places the insertion point as a right sibling of the currently selected node or subtree. The command is entered by positioning the mouse pointer to the right of the currently selected subtree and clicking the mouse. For example, when the currently selected portion is the subtree with nodes 304–312 and the programmer places the insertion point as a right sibling, the program tree editor inserts subsequent nodes between nodes 304 and 303. The following illustrates the select before node command.

```
{
  B = 4
  A = B + 3 * (4 − C)
>
  D = A/2
}
new data: C = 2
{
  B = 4
  A = B + 3 * (4 − C)
>
  C = 2
  D = A/2
}
```

Certain operators require a certain number or minimum number of operands. For example, the "30 "0 operator requires two operands. When an "=" operator is being entered, the program tree editor creates a "=" node with two operand nodes. If the operands have not yet been specified, then the program tree editor set the operand nodes to "to be determined" (TBD), also referred to as "undefined," which is displayed as "???". For example, when entering the statement "A=B+3*(4−C)" the TBD identifier, "???", is displayed to represent undefined operand nodes. The following illustrates the entering of the statement.

A=???
A=B|
A=B+???
A=B+3|
A=B+3*|
A=B+3*???
A=B+3*(4−???)
A=B+3*(4−C|)

The above example illustrates a preferred default selection of a node and an insertion point performed by the program tree editor during insertion of nodes into a program tree. If, however, a user wishes to enter the statement "A=B+(3*4)−C", then the user would enter the nodes as above until the following is displayed.

A=B+3*4|

The user would then select the node represented by the "*" operator to change the current selection which is represented by the following.

A=B+3*4|

The user would then proceed with entering the "−C" as illustrated by the following.

A=B+(3*4)−???
A=B+(3*4)−C

During creation of a program tree, there can be many undefined nodes. The program tree editor maintains a "To-Do" list identifying these nodes. The "To-Do" list can be maintained in order of creation of the undefined nodes or other ordering. Before transforming a program tree a programmer would typically ensure that all nodes on the "To-Do" list are defined. The use of undefined nodes ensures that the program tree is correctly structured without forcing a programmer to always enter complete computational constructs. For example, a programmer could create a program tree corresponding to the following:

if {???}
  (???)
else
  {B=1}

The "To-Do" list would contain an undefined node corresponding to the conditional part and the then-part of the if statement. The programmer could then edit other parts of the program tree and later define these undefined nodes.

The program editor allows data to be pasted at the insertion point. The sources of the data are from the "Source Well," the clipboard, or other secondary source. The Source Well contains

- all local variables
- all types
- all computational constructs
- all globals
- all operators
- all procedures The contents of the Source Well changes as the insertion point changes to represent the data that can be appropriately inserted at the insertion point.

Primitive nodes which can be pasted into the program tree are available as distinct commands in the commands well. For example, "Paste+" will paste a "+" node. The vertical toolbar at the left of the program text area preferably lists these commands, organized into the following categories:

- Statements, such as if, for, switch, goto, label, etc.
- Arithmetic operations, such as +, − etc.
- Assignment operations, such as =, +=, etc.
- Relations, such as ==, >, etc.
- Boolean and logical operations, such as &, &&, <<, etc.
- Increments and Decrements
- Data structure operations, such as &, *, −, >, [], etc.
- Groupings and calls, for example {}, a (), specialization, etc.

The keyboard can be used for typing in program text. A substantial portion of keystroke and mouse event sequences are handled by the command keystroke mapping facilities of the program tree editor. The program tree editor divides keyboard input into tokens. Before the end of a token is reached, backspace may be used to edit the token and the token text is visible on the screen at the insertion point. Tokens are delimited by either:

- A space or spaces
- When special characters follow alpha or number characters, as in a +
- When alpha or number characters follow special characters, as in +b
- Some characters form a token by themselves and terminate what was before, for example, a semicolon
- There may be other escape conventions for tokens that include both alpha and special characters The tokens are then looked up in the various key maps and a symbol list:

- First, the token may be directly associated with a command in a keymap. For example, the token "if" may result in the execution of the "Paste if" command.
- Next, the token is "looked up" by traversing the tree from the selection towards the root. The tokenizer searches for right operands of field selections in structure declarations. The tokenizer also searches local declarations in procedures, global declarations in modules, and declarations in the system libraries. The program tree editor also preferably maintains a symbol list containing the names associated with the various DCL TES. The tokenizer can search this list for matching names. If token does not represent a unique name, the tokenizer can present the programmer with further identifying information to help the programmer identify the appropriate node with a non-unique name.

Thus, the program tree editor will find the token "+", for example, as the name of an operation typically in a system library. The effect of this token will be to execute a "Paste +" command to paste a "+" operator node into the program tree.

The program editor tree also provides commands for expanding and collapsing the display representation of a program tree. The display representation of a program tree can be expanded and collapsed, in whole, or in part, in outline fashion. A collapsed element is identified by a gray bullet in the left margin. The following commands may be used to expand and collapse a display representation: expand all, expand next level, collapse all, and collapse next level.

Figure 8:
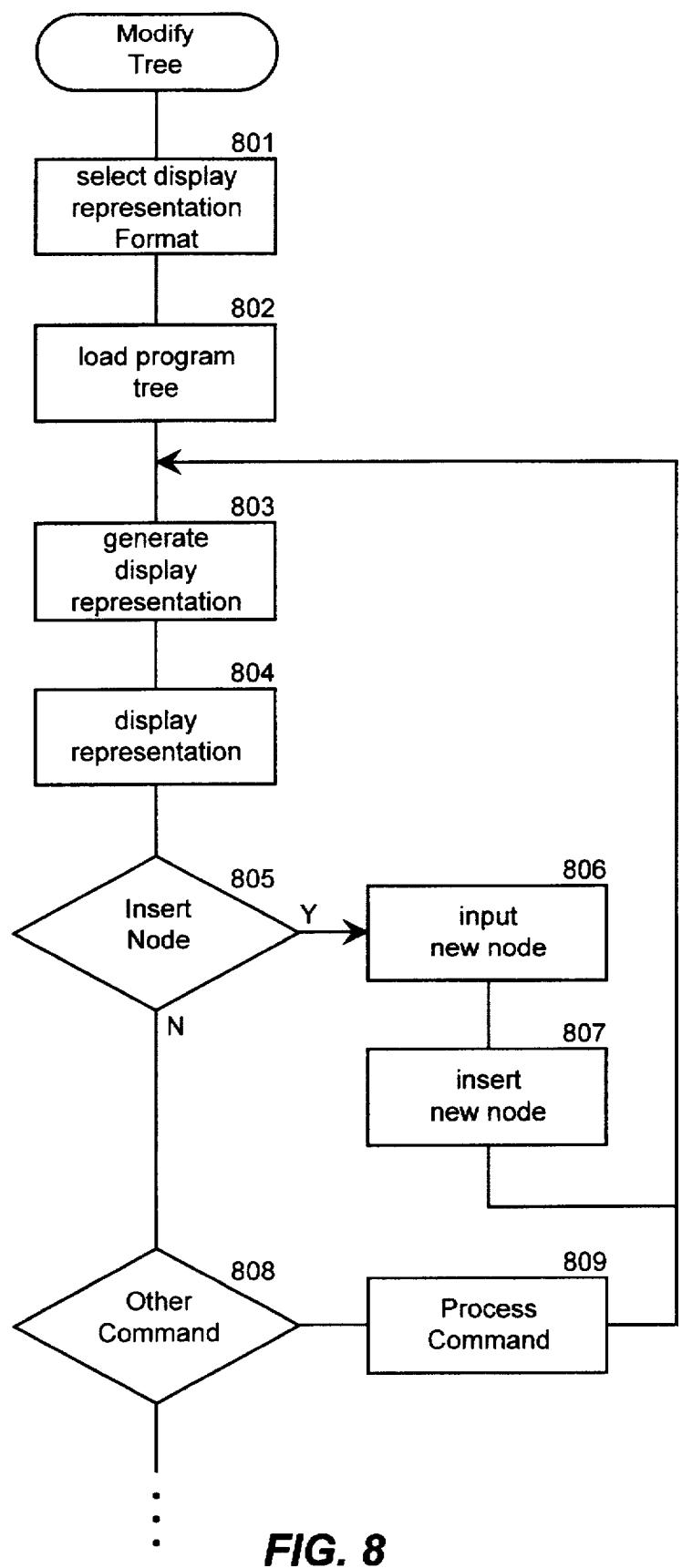
FIG. 8 is a flow diagram of the modify program tree subroutine of facility.

FIG. 8 is a flow diagram of the modify program tree subroutine of the facility. In steps 801–807, the facility loads a program tree, generates and displays a representation of the program tree, and allows a programmer to insert nodes into the program tree. In step 801, the facility allows the programmer to select an available display representation format. In a preferred embodiment, the user may select another display representation format at a later time, and the facility will instead use the newly selected format when displaying the program tree.

In step 802, the facility loads a program tree into memory in response to a command from the programmer. The program tree that is loaded may have been stored by a previous invocation of the modify program tree subroutine. The program tree may also have been created in other ways, such as parsing conventional source code. The facility preferably can omit this step in order to construct a program tree initially.

In step 803, the facility uses the selected representation format to generate a display representation of the program tree. To generate a display representation, the facility traverses the program tree in a depth-first manner and representing each node in the program tree with text or graphics specified by the representation format. The use of graphics or bitmaps allows pictures to be used for operator, operand, and declaration names or pointers (directed arc) could be drawn to the corresponding declaration. For example, if a constant value represents an I-beam cursor, then an I-beam bitmap can be used to represent the identifier of the constant. Also, there can be several representation formats (stored as properties) for a name. For example, a DCL TE can have a short name and a long name. The programmer could display the program tree using the short name, but when debugging a section that the programmer is unfamiliar with the programmer could display the long name (which are presumedly more descriptive). Alternative names could also be stored in various foreign languages. The display representation generator is described below in detail.

In step 804, the facility displays the representation on the display device. The facility displays an insertion point indication at a position within the display representation that corresponds the insertion point. In a preferred embodiment, the facility preferably displays only a portion of long display representations, and allows the user to scroll within the display representation, causing the facility to display a different portion of the program tree. The facility preferably generates in step 803 only as much of the display representation of the program tree as is necessary to produce the displayed portion of program tree.

In step 805, if the programmer wishes to insert a node, then the facility continues at step 806 to insert the node, else the subroutine returns. In step 806, the facility inserts a new node. A programmer inserts a new node by selecting a type of node to insert and a position in the program tree at which to insert the node. The process of inserting a node is described in detail below.

In step 807, the facility stores the program tree containing the inserted node. The facility may store the program tree in memory, on the storage device, or both. At any point after the program tree has been stored, it may be used by the programmer in a variety of ways. For example, the programmer may transform the stored program tree into an executable code, or the programmer may debug the program tree by invoking a debugging utility. After step 807, the facility continues at step 803 to generate the display representation for the program tree containing the inserted node, to display the generated representation, and to allow the programmer to insert further nodes. In step 808, if a command other than an insert node command is received (e.g., selection or re-position insertion point), then the facility processes the command in step 809 and loops to step 803 to update the display device.

Figure 9:
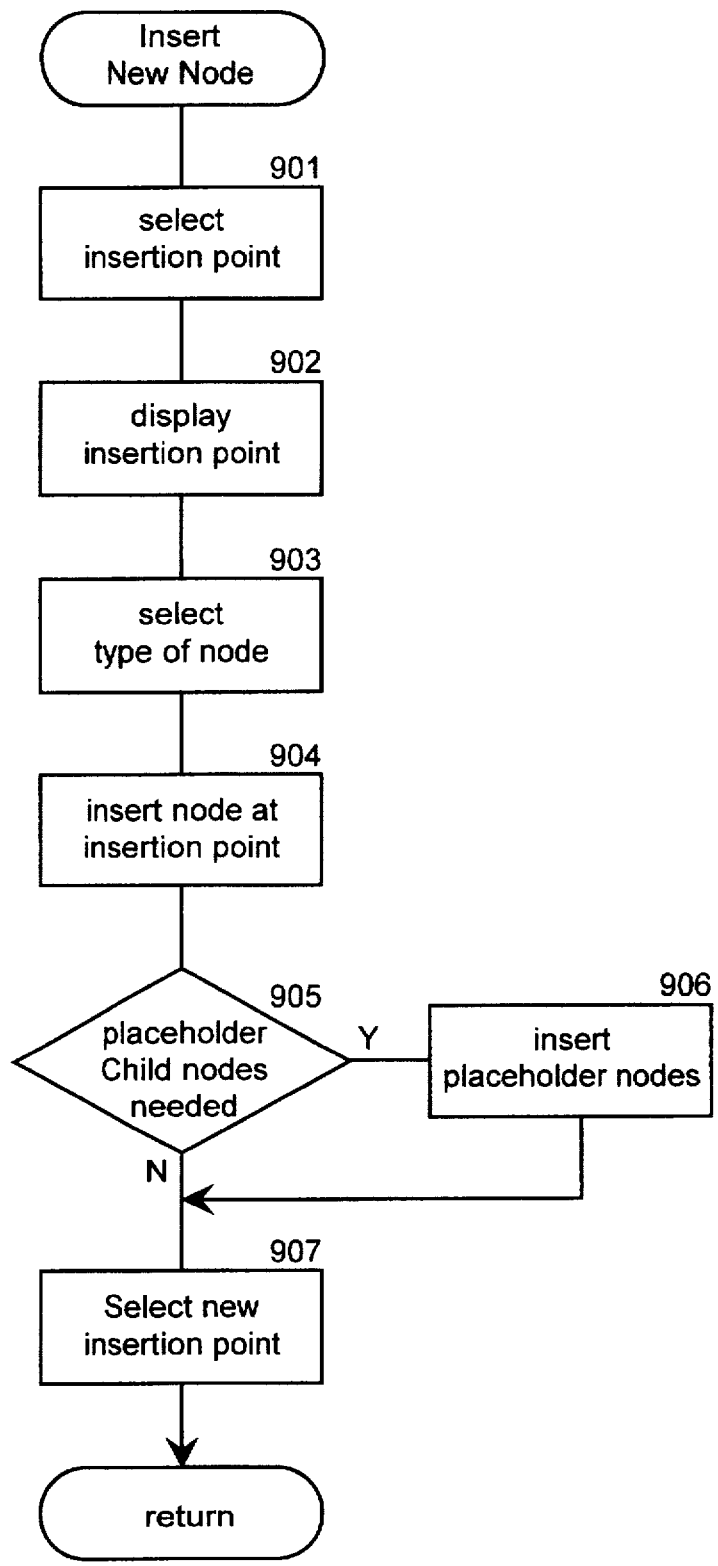
FIG. 9 is a flow diagram of the insert new node subroutine.

FIG. 9 is a flow diagram of the insert new node subroutine that shows step 803 in greater detail. In steps 901–907, the facility inserts a node of a type specified by the programmer at an insertion point, then inserts any placeholder nodes required by the new node, and selects a new insertion point.

In step 901, the facility allows the user to select an insertion point with reference to the display representation. In this step, the facility allows the programmer to select as the insertion point any position in the display representation that corresponds to either a node of the program tree or a separation between nodes of the program tree. The programmer may select the insertion point by pointing to the display representation using the pointing device. The programmer may also use the keyboard to select insertion point by pressing a combination of cursor positioning keys that moves the cursor to the insertion point within the display representation. The program may also use an insertion point positioning command provided by the facility. These commands move the insertion point to a given position in the program tree, either absolute or relative to the current position of the insertion point.

In step 903, the facility allows the programmer to select the type of node that should be inserted at the insertion point. In a preferred embodiment, the facility displays a list of paste commands for available node types and allows the user to select one. The facility preferably specifies the types of nodes which may inserted as children of each node type. After the user has selected to paste a node type, the facility verifies that a node of the selected type may properly be inserted at the insertion point. This involves checking that a node of this type is a proper child of the node above the insertion point. If a node of the selected type may not properly be inserted at the insertion point, the facility preferably permits the programmer to choose another node type or insertion point.

In step 904, the facility inserts a node of the selected type into the program tree at the insertion point. If the insertion point is at a node of the program tree, then the facility replaces the node at the insertion point with the inserted node. On the other hand, if the insertion point is a separation between nodes of the program tree, then the facility makes the inserted node a child of the node above the insertion point, as well as making any node below the insertion point a child of the inserted node.

The facility preferably specifies a minimum number of children for each type of node. In step 905, the facility checks to see how many children are required for a node of the selected type. If a node of the selected type requires more children than the inserted node presently has, then the facility continues at step 906 to insert nodes of a special type, called placeholder nodes, as children of the inserted node until the inserted node has the required number of children, else the facility continues at step 907.

In step 907, the facility selects a new insertion point. The facility selects the insertion point that the programmer is likely to select next. To this end, if the facility inserted any placeholder nodes in step 906, then the facility preferably selects one of the inserted placeholder nodes. If the facility selects the correct insertion point, then the programmer can skip the step of selecting the next insertion point and proceed directly to selecting the next type of node to insert.

THE COMMAND WELL EDITOR

The command well editor controls configuration of the user interface of the program tree editor. The facility provides a command well that contains each command provided by the facility. In a preferred embodiment, each command has associated with it a unique identifier and function for implementing the command. A preferred command well is described in U.S. patent application Ser. No. 07/819,194, entitled "METHOD AND SYSTEM FOR CUSTOMIZING A USER INTERFACE IN A COMPUTER SYSTEM." The program tree editor provides a user interface that includes a menu hierarchy, various toolbars, and various keymaps. The command well editor allows a programmer to customize the user interface. The command well editor allows a programmer specify the menu hierarchy. A programmer can specify the names of menu items and the corresponding command to perform when the menu item is selected. The user interface preferably includes a horizontal and a vertical toolbar. The command well editor allows a programmer to specify which commands are to be included on the toolbars. Each command typically has a bitmap specifying a button for the toolbar. The user interface preferably includes a left margin and a program text keymaps. The command well editor allows a programmer to specify the mapping of a key (or mouse event) or sequence of keys to commands. For example, a double click in the program text area may map to a command to select a node, whereas a double click in the left margin may map to a command to display a subtree. Also, if a programmer maps the letters "if" (the "if" token) to the "Paste if" command in the program text keymap, then when the programmer types "if" within the program text area the "Paste if" command is executed which causes a node to be inserted at the current insertion point.

Figure 7:
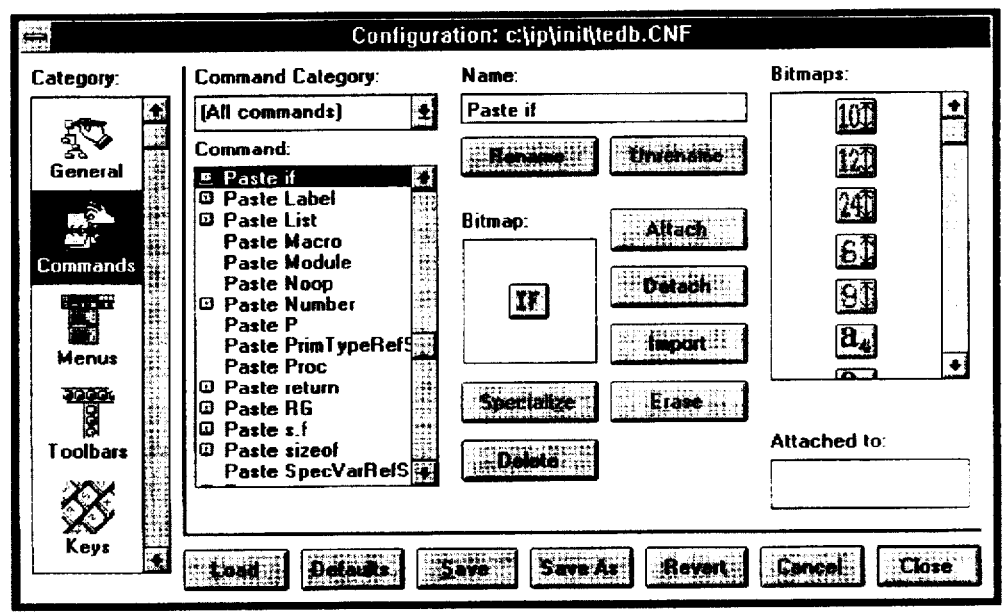
FIG. 7 illustrates components of the user interface of the command well editor.

FIG. 7 illustrates components of the user interface of the command well editor. The command well editor provides a list of all commands implemented by the program tree editor. The command well editor allows a programmer to specify the bitmap associated with each command. The command well editor provides a category list box to allow the programmer to select which category of the user interface to customize. The menus category allows a programmer to customize the menu hierarchy. The toolbars category allows a programmer to customize the toolbars. The keys category allows a programmer to customize the keymaps.

THE DISPLAY REPRESENTATION GENERATOR

The display representation generator receives requests from the program tree editor to display representations of the program tree on the display device. The display representation generator requests each node of the program tree to display its representation based on the currently selected display representation format. The display representation generator uses a depth-first left-to-right traversal of the program tree.

Figure 10:
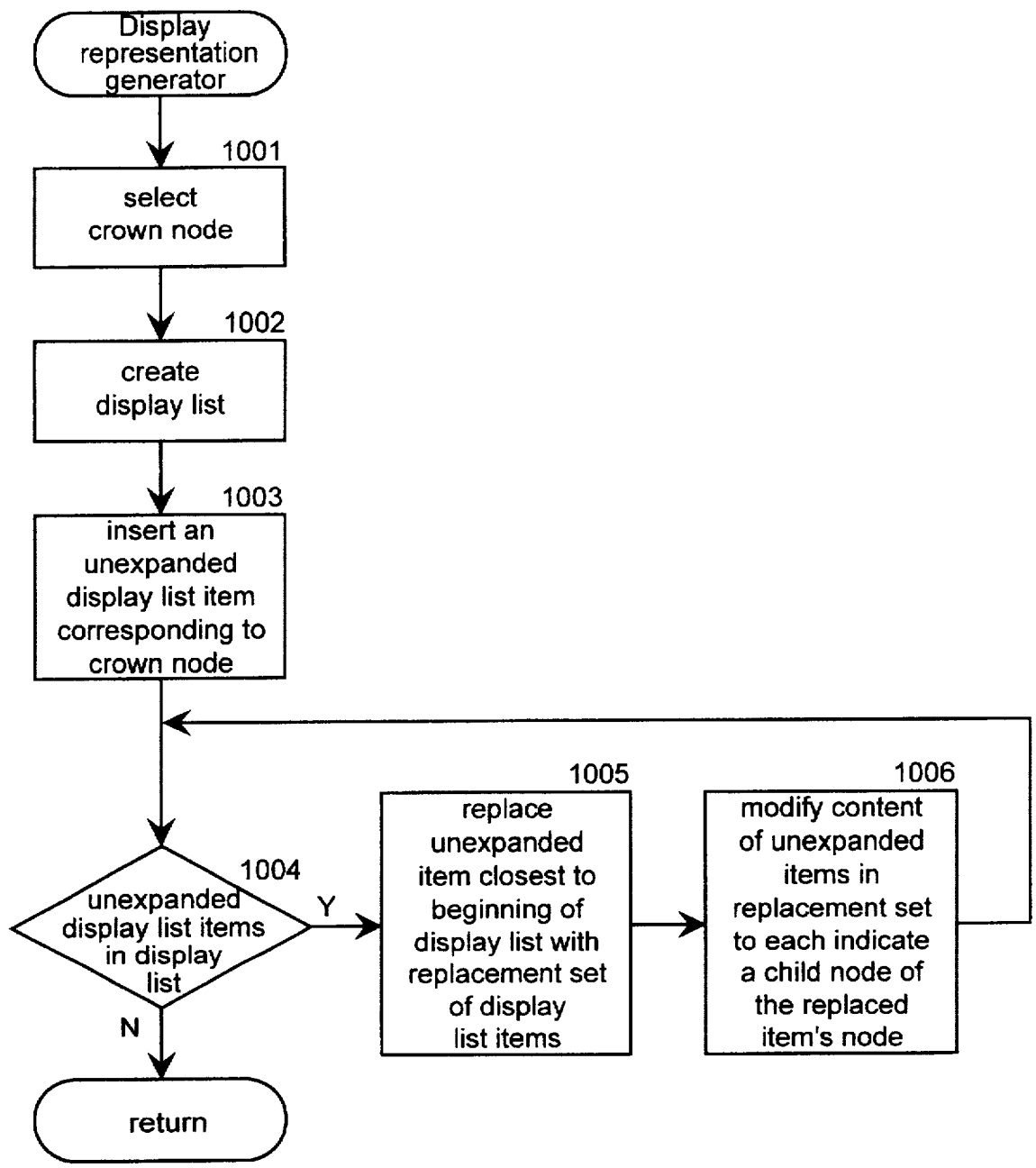
FIG. 10 is a flow diagram of the generate display representation subroutine.

FIG. 10 is a flow diagram of the generate display representation subroutine that shows step 806 in greater detail. One skilled in the art would appreciate that well-known techniques exist for displaying trees. In steps 1001–1006, the facility generates a display representation of the program tree by traversing the program tree in a depth-first, left-to-right manner and by generating the display representation for each node. In step 1001, the facility determines the portion of the program tree for which to generate a display representation by selecting a subtree of the program tree. A subtree is defined by a crown node, and contains the crown node and all of the descendants of the crown node. The facility preferably selects the crown node by moving up the tree from the insertion point until the current node defines a subtree whose display representation is likely to fill the space of the display device allocated for the display representation.

In step 1002, the facility creates a data structure called a display list. After the facility completely expands the display list, the facility uses it to display the representation. The display list is a linked list that contains display list items, each of which can either be unexpanded or expanded. Unexpanded display list items correspond to a node of the subtree. Expanded display list items, on the other hand, correspond to one of one or more pieces of the display representation associated of the type of a particular node of the subtree. In step 1003, the facility inserts into the display list an unexpanded display list item corresponding to the crown node. In steps 1004–1006, the facility progressively expands the display list items until the display list is completely expanded.

In step 1004, if the display list contains unexpanded display list items, then the facility continues at step 1005, else the subroutine returns. In step 1005, the facility replaces the unexpanded display list item closest to the beginning of the display list with a replacement set of display list items specified by the selected representation format. Some of the display list items may be expanded and correspond to the actual display representation, while others may be unexpanded and correspond to nodes of the subtree that are children of the node to which the replaced display list entry corresponds. In step 1006, the facility modifies the content of the unexpanded display list items of the replacement set to each indicate a particular child node of the node to which the replaced display list entry corresponds.

Figure 11A:
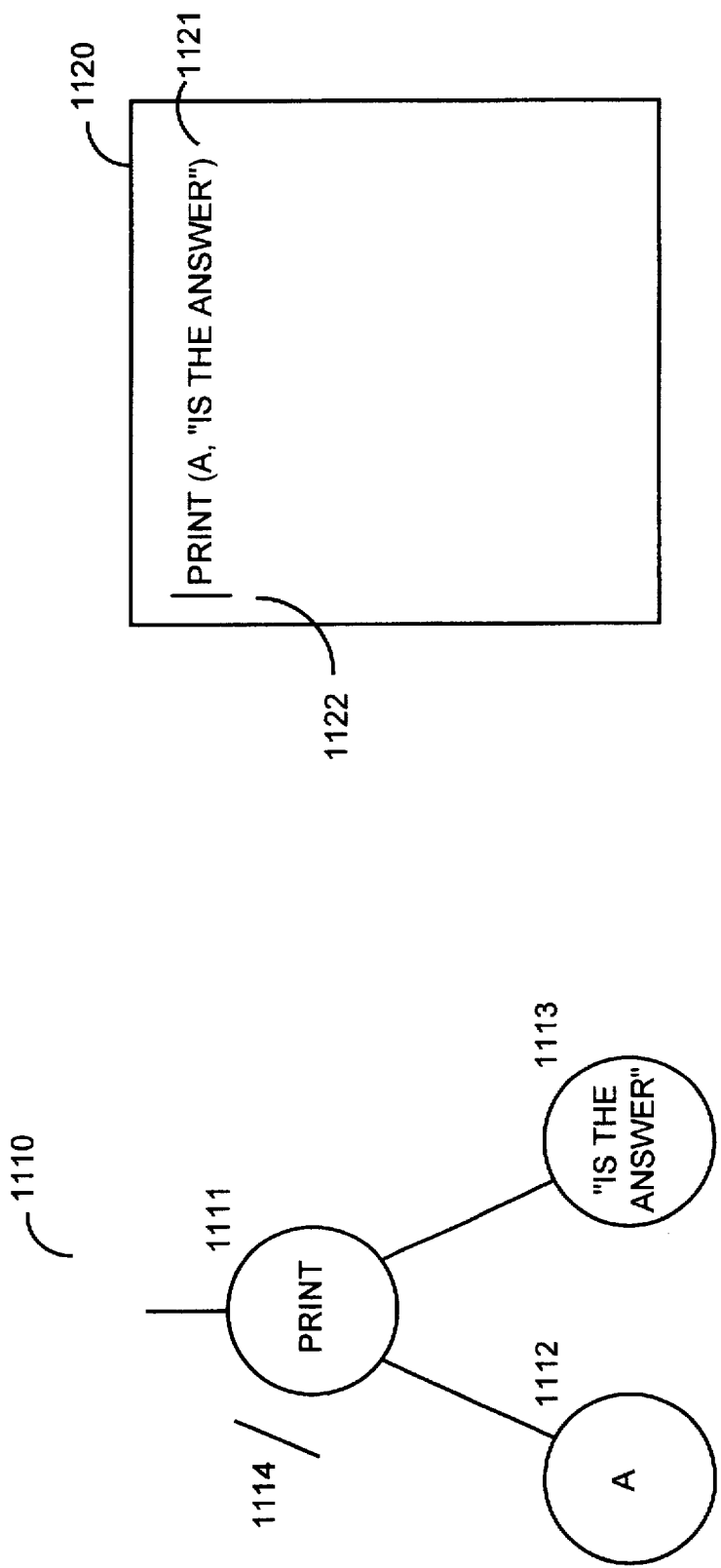
FIGS. 11A–11D are sample diagrams showing the contents of a subtree and the display representation at various times during the insertion of two new nodes into the subtree.

FIGS. 11A–11D are sample diagrams showing the contents of a subtree and the display representation at various times during the insertion of two new nodes into the subtree. FIG. 11A is a sample diagram showing the contents of the subtree and the display representation before any insertion has been performed. The subtree 1110 is defined by its crown, a print node 1111, specifying a display operation. The print node is a child of another node, such as a grouping node, not shown. An "A" variable reference node 1112 and a "IS THE ANSWER" string node 1113 are children of the print node. The insertion point 1114, shown as a diagonal bar, is located above the print node. The display representation 1120 contains a line of text 1121 corresponding to the subtree. An insertion point 1122, shown as a vertical bar cursor, is positioned at the beginning of the line.

Figure 11B:
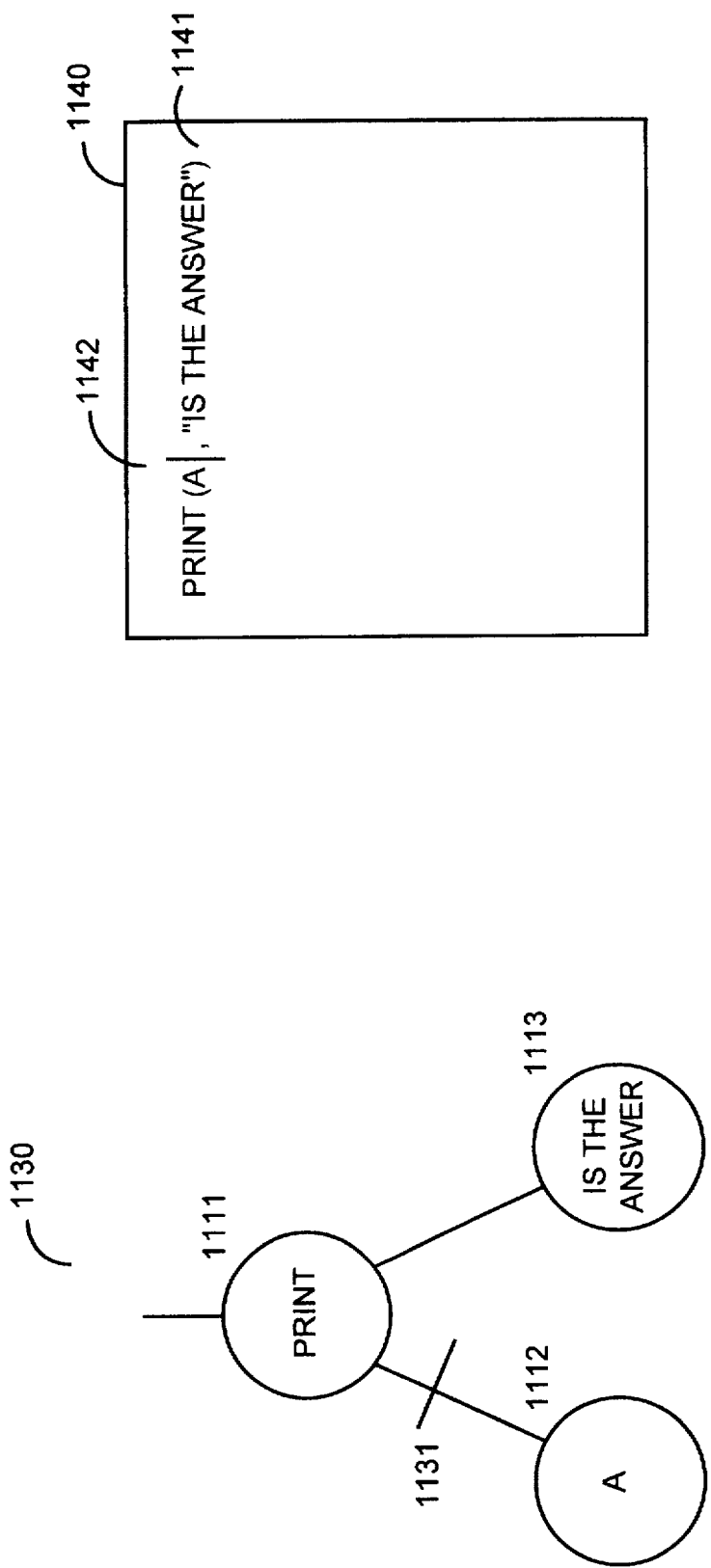

The programmer then moves the insertion point to between the characters "A" and "," in the display representation. The programmer moves the insertion point by either pointing to the new position with a pointing device, using cursor positioning keys to move the cursor to the new position, or using a move to child positioning command. FIG. 11B is a sample diagram showing the program tree and the display representation after the facility has moved the insertion point to above the "A" variable reference node. The insertion point 1142 is now positioned between the "A" character and the "," character. The insertion point 1131 has moved to between the print node and the "A" variable reference node.

Figure 11C:
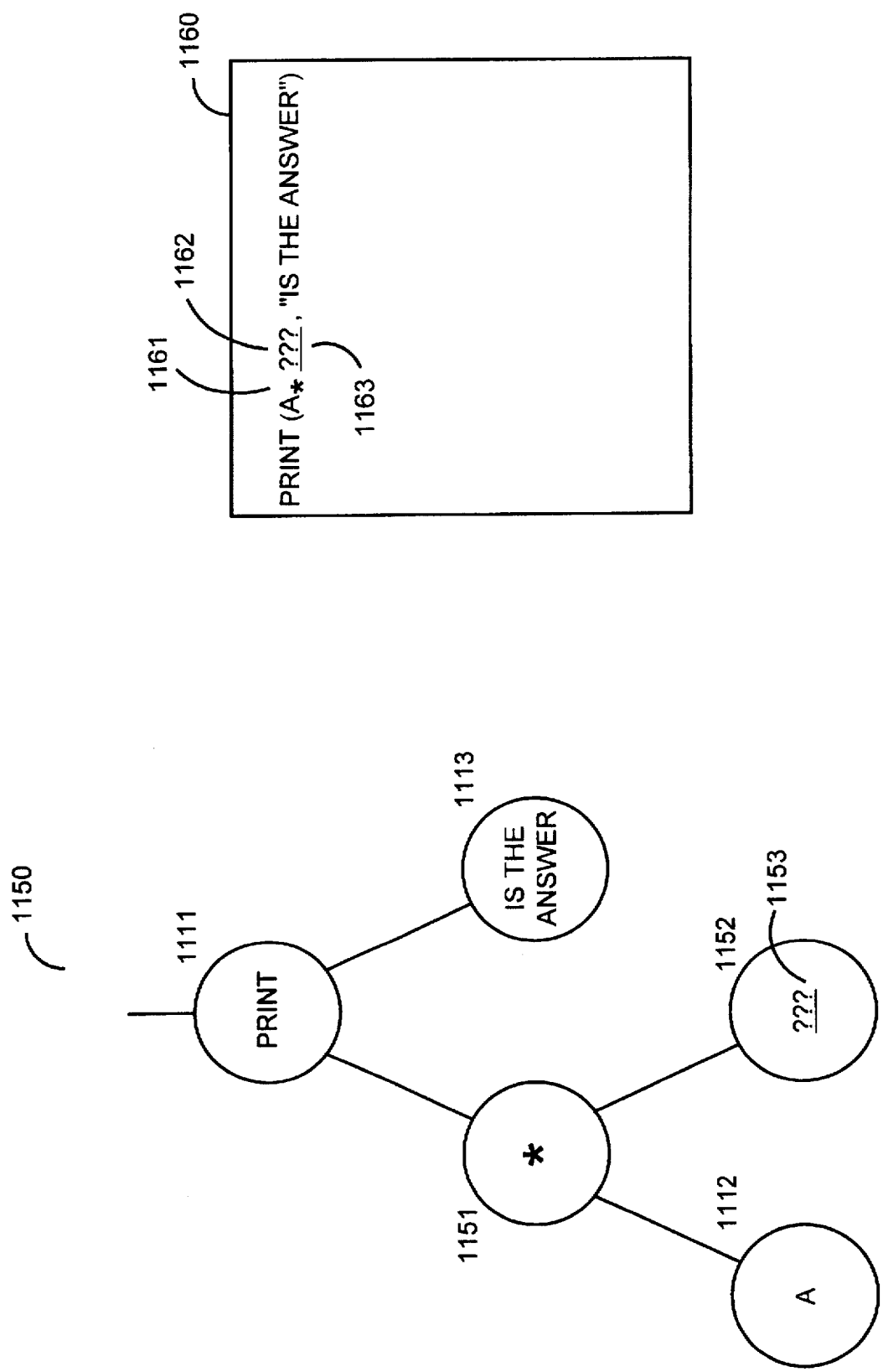

The programmer then selects the multiplication node type to insert (paste) at the current insertion point. FIG. 11C is a sample diagram showing the program tree and the display representation after the facility has inserted a multiplication node as the parent of the "A" variable reference node. In the subtree, the facility has inserted a multiplication node 1151 as a parent of the "A" variable reference node. Because multiplication nodes require at least two children (as multiplication is a binary operation), the facility has also inserted a placeholder node 1152 as a second child of the new multiplication node. Because the user is likely to next insert a node to replace the placeholder node, the facility has moved the insertion point 1152 to the placeholder node. In the display representation, the facility has generated an asterisk as the display representation for the new multiplication node and question marks for the new placeholder node, and moved the insertion point to the question marks.

Figure 11D:
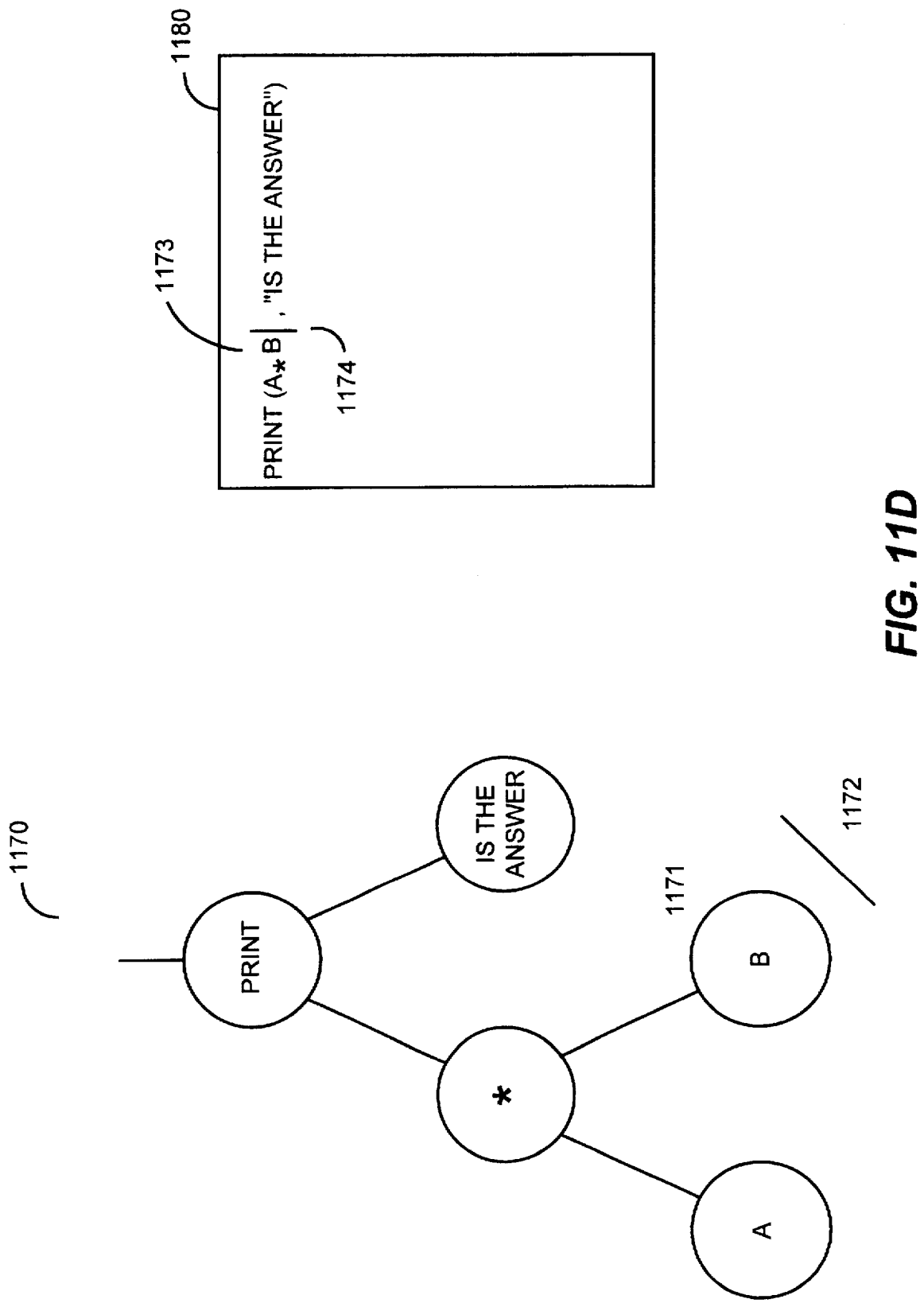

The program then selects the "B" variable reference node type to insert at the insertion point. FIG. 11D is a sample diagram showing of the program tree and the display representation after the facility has inserted a "B" variable reference node as a child of the multiplication node. In the subtree, the facility has inserted a "B" variable reference node 1171 to replace the placeholder node. Because the user is likely to next insert a node after the "B" variable reference node, the facility has moved the insertion point 1172 to below the "B" variable reference node. In the display representation, the facility has generated a "B" as the display representation of the newly inserted node in place of the question mark, and moved the insertion point to after the "B".

Figure 12A:
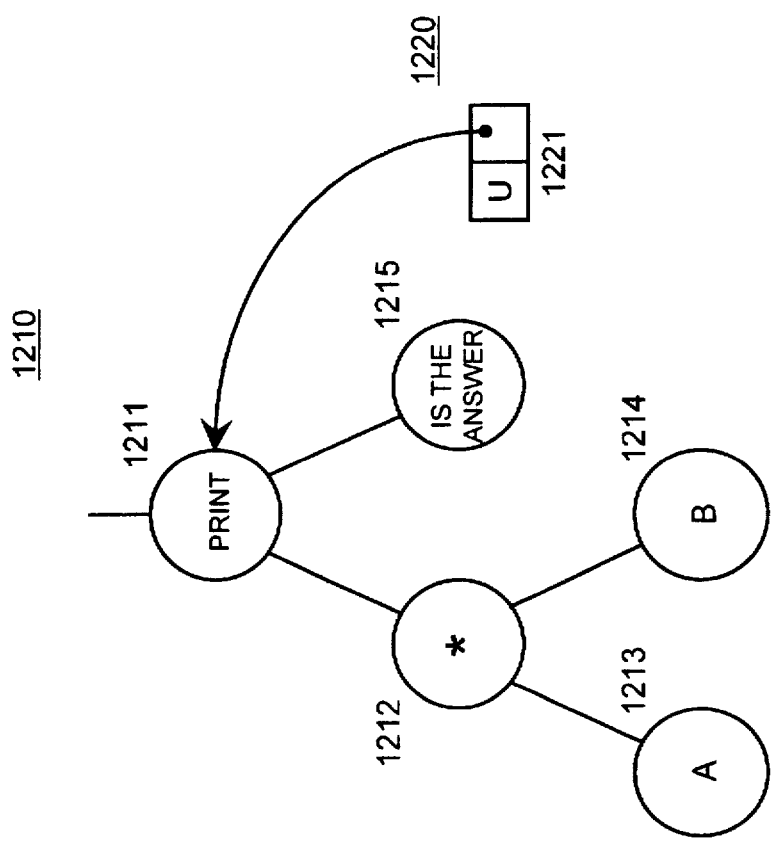
FIGS. 12A–12F show the execution of the generate display representation tree subroutine.

To produce each display representation in FIGS. 11A–11D, the facility executes the generate display representation subroutine. FIGS. 12A–12F show the execution of the generate display representation subroutine to produce the display representation 1180 shown in FIG. 11D. FIG. 12A is a diagram of the display list at the beginning of the generation of a display representation. The subtree 1210 has nodes 1211–1215. The display list 1220 has a single display list entry 1221. Display list entry 1221 is unexpanded, as shown by the character "U" inside the display list entry, and its content indicator indicates the print node 1211.

Figure 12B:
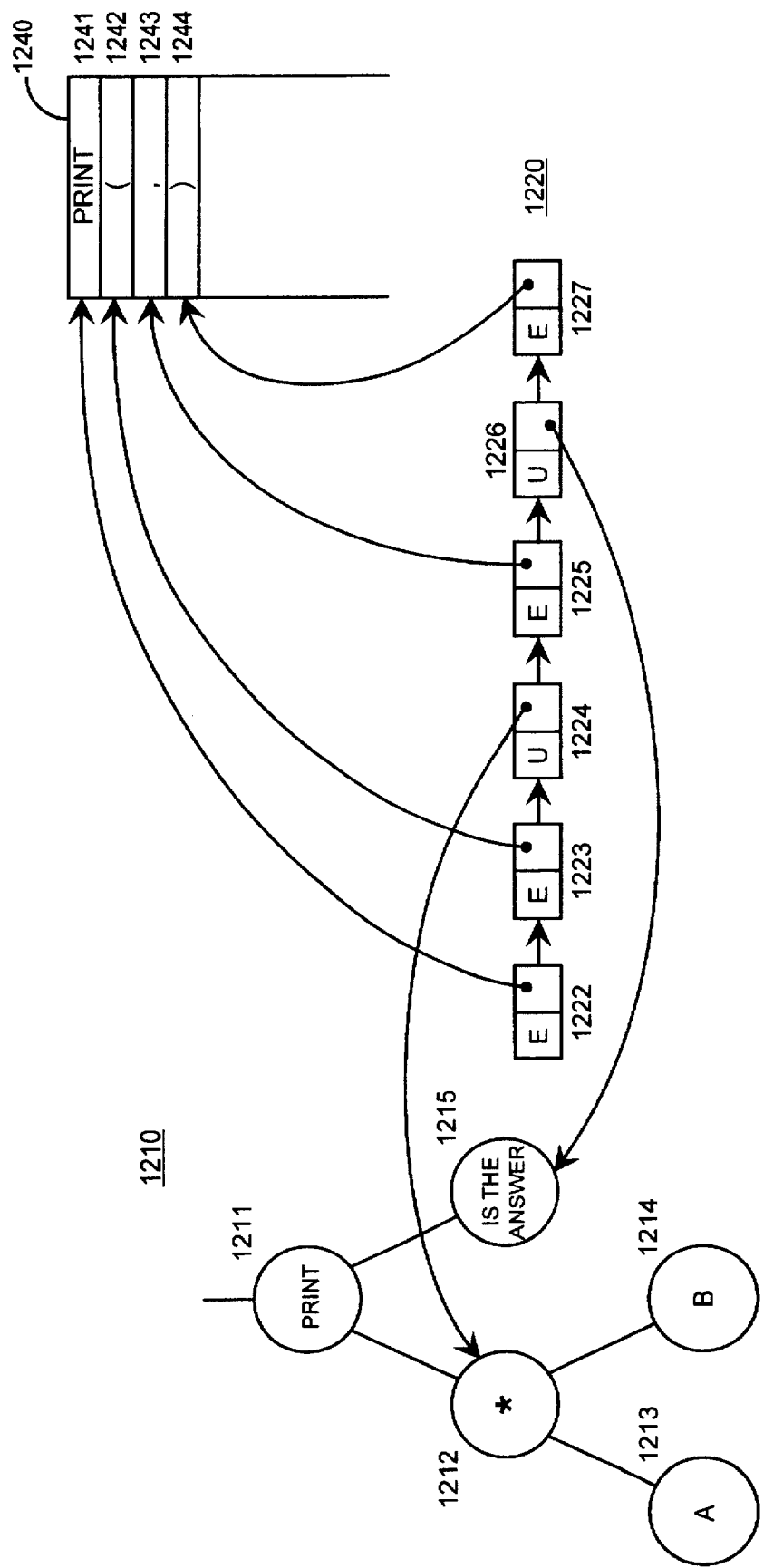

FIG. 12B is a diagram of the display list showing the expansion of display list entry 1221. The display list has display list items 1222–1227. These display list entries are those in the replacement set for print nodes of the display representation format of the Basic language. The diagram also shows a string table 1240 having entries 1241–1244. Display list entry 1222 is expanded, and its content indicator indicates the "PRINT" string 1241. When display list entry 1222 is displayed, the "PRINT" string will be displayed. Display list entries 1223, 1225, and 1227 are also expanded, and their content indicators also each indicate a string that will be displayed when the display list is displayed. Display list entry 1224 is unexpanded, and its content indicator indicates the multiplication node 1212. Display list entry 1226 is similarly unexpanded, and its content indicator indicates the "IS THE ANSWER" string node 1215. The unexpanded nodes will be expanded further.

Figure 12C:
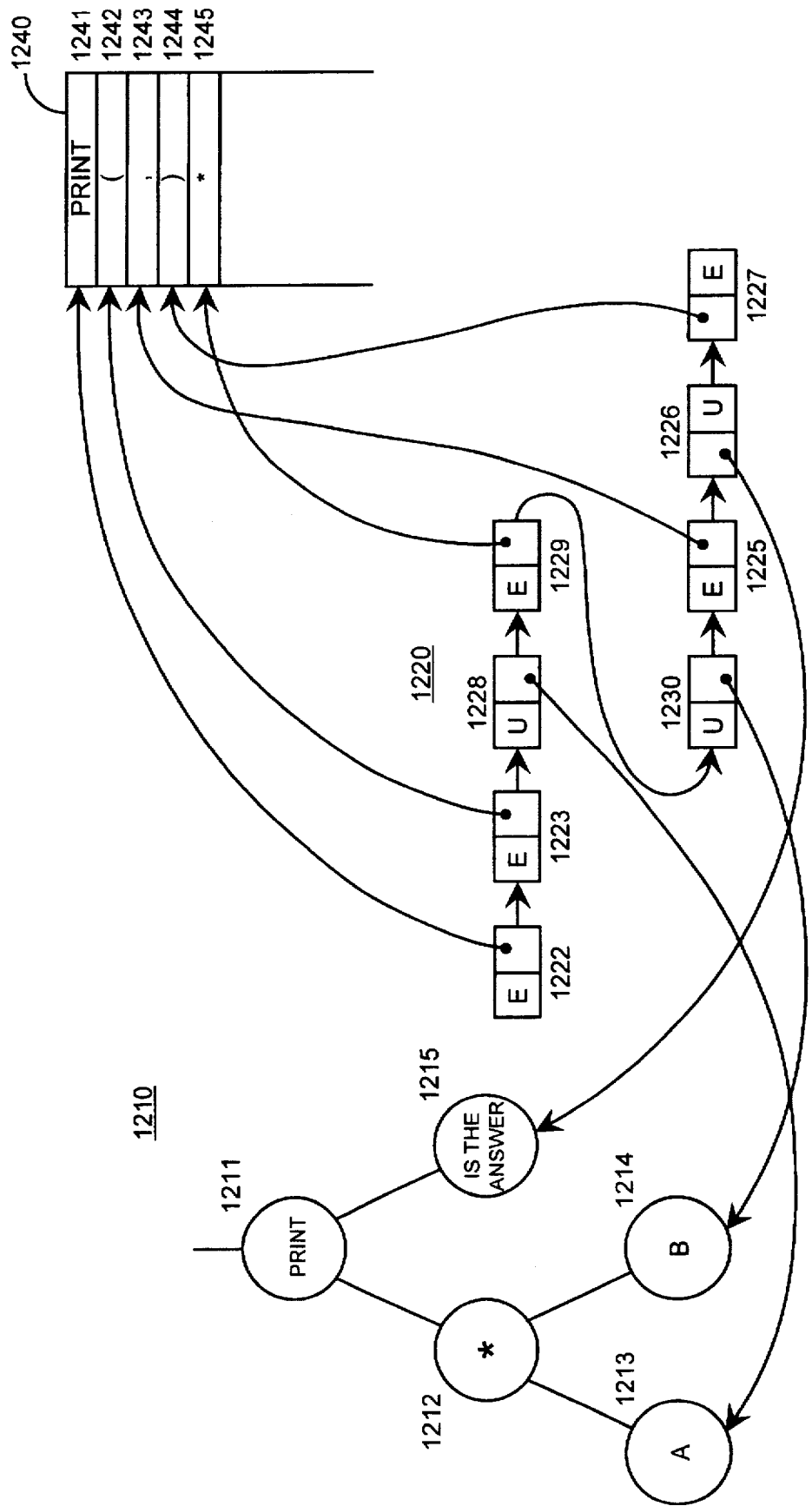

FIG. 12C is a diagram of the display list showing the expansion of display list entry 1224. The facility selects display list entry 1224 to expand because it is the first unexpanded display list entry in the display list. Display list entry 1224 has been expanded into display list items 1228–1230. Display list entry 1228 is unexpanded, and its content indicator indicates the "A" variable reference node 1213. Display list entry 1229 is expanded, and its content indicator indicates a "*" string 1241. Display list entry 1224 is unexpanded, and its content indicator indicates the B variable reference node 1214.

Figure 12D:
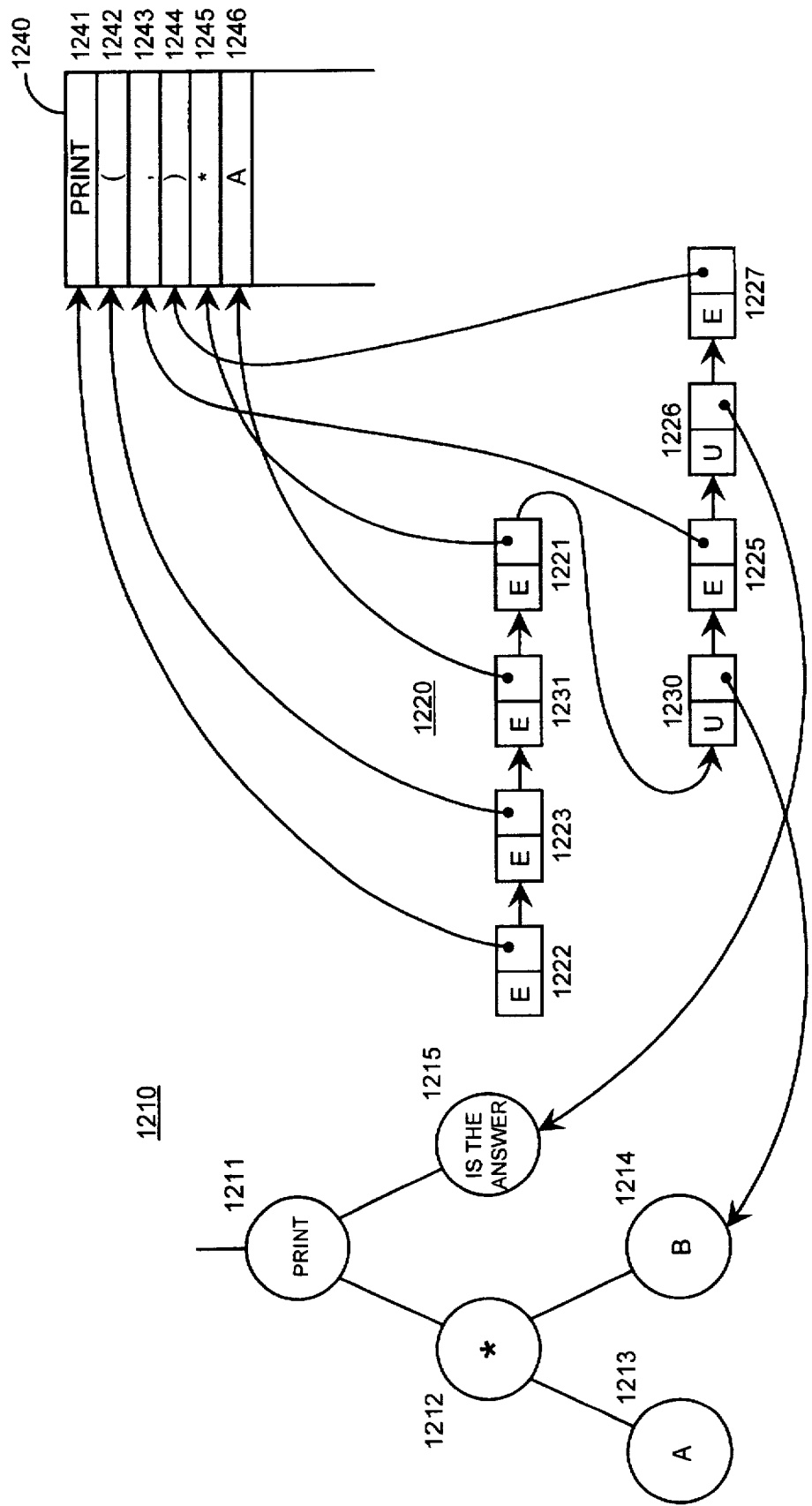
Figure 12E:
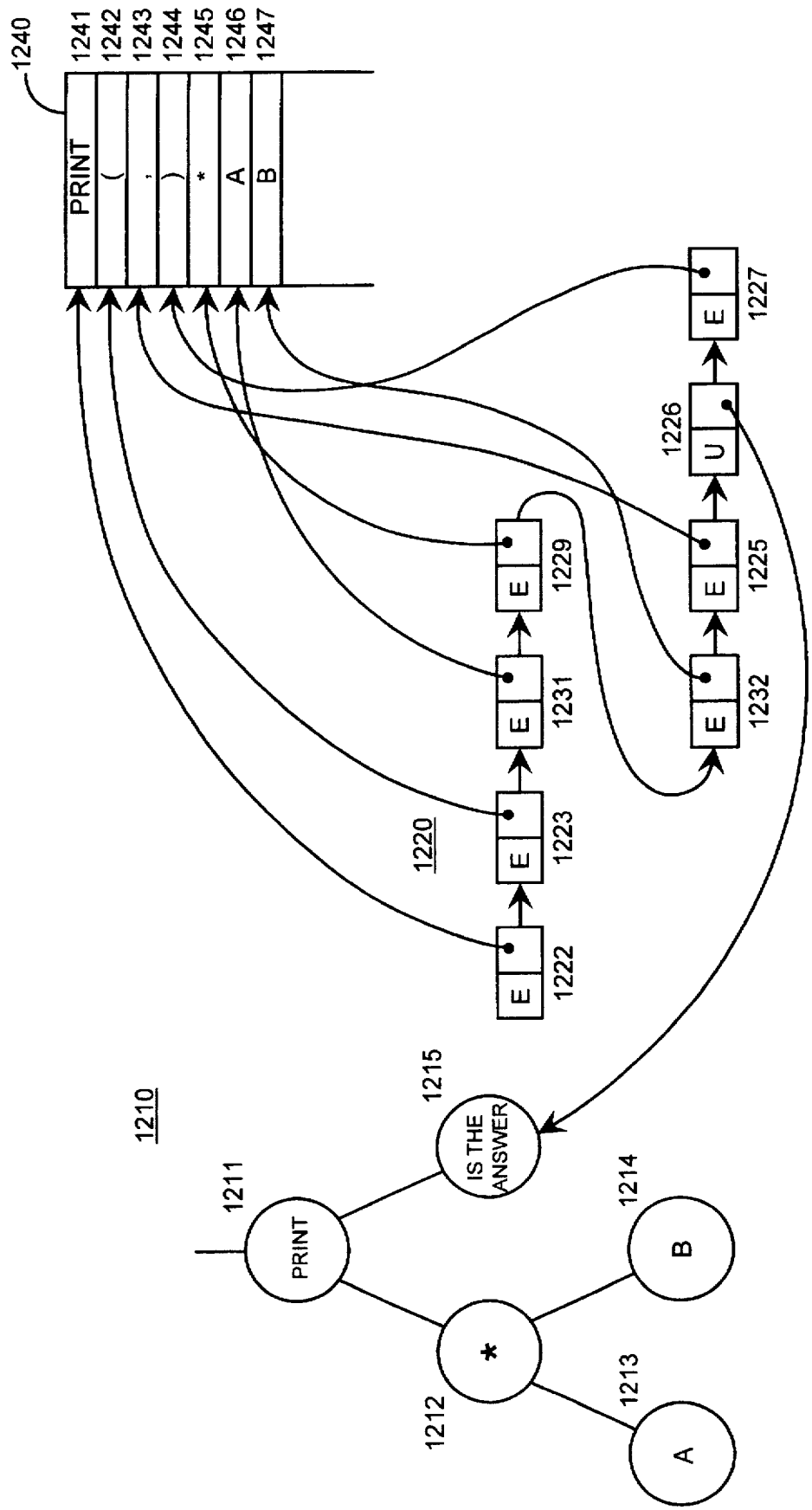
Figure 12F:
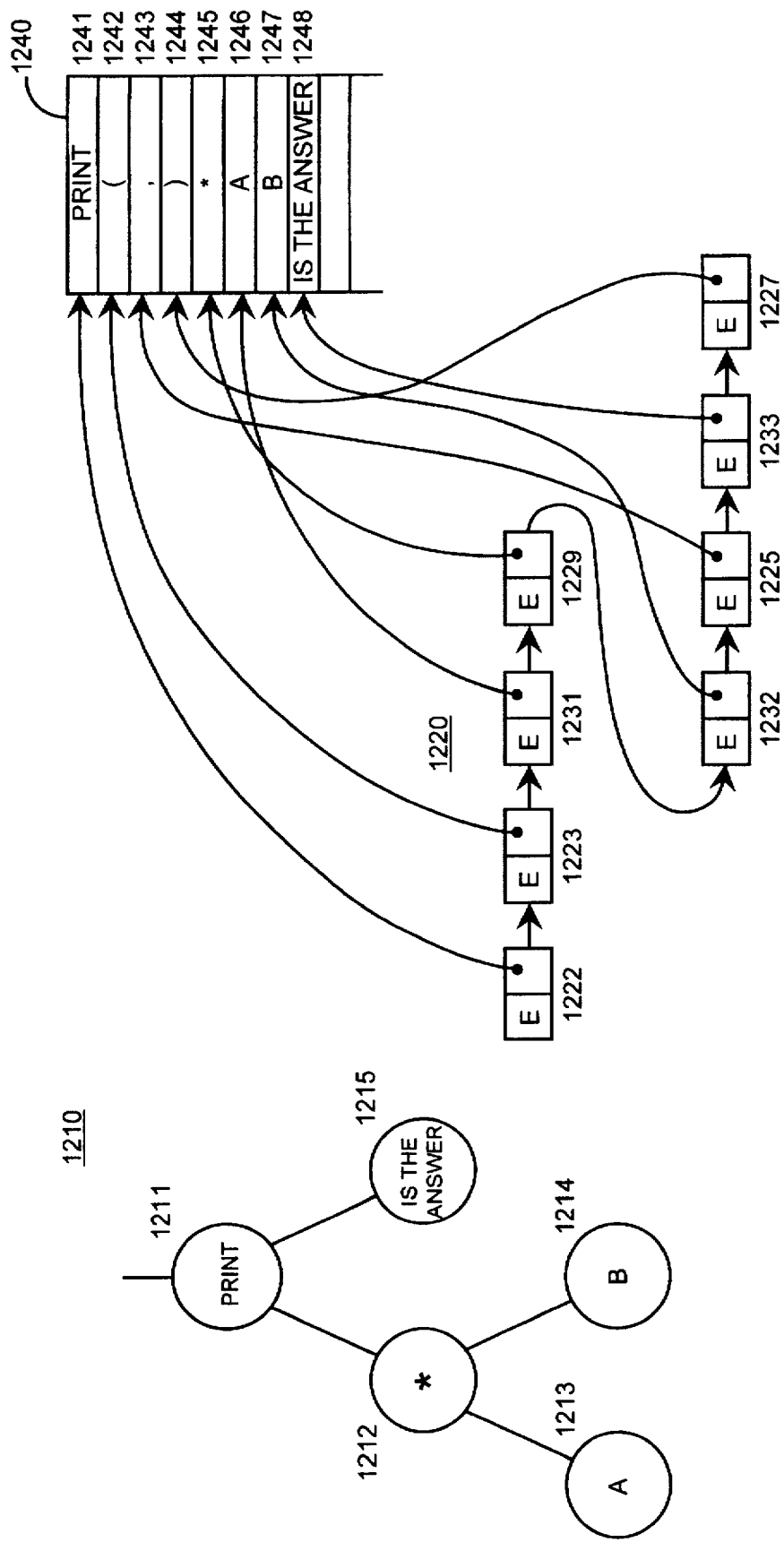

FIGS. 12D–12F are diagrams of the display list showing the expansion of display list entries 1226, 1228, and 1230. In FIG. 12F, the display list is fully expanded. The facility displays the fully expanded display list to display the unparsed text as shown in FIG. 11D by traversing the display list from beginning to end, displaying the text of the string indicated by the content indicator of each display list entry.

Although the present invention has been described in terms of a preferred embodiment, it is not intended that the invention be limited to these embodiments. Modifications within the spirit of the invention will be apparent to those skilled in the art. The scope of the present invention is defined by the claims that follow.

I claim:

1. A method in a computer system for specifying a computer program, the computer program being represented by a program tree, the program tree being a tree data structure having nodes, each node representing a computational construct of the computer program, the method comprising:
   initializing the program tree to contain a root node representing a computational construct that contains all other computational constructs of the computer program; and
   repeating the following until all computational constructs of the computer program are represented by nodes contained in the program tree,
      displaying a representation of the computer program represented by the nodes currently contained in the program tree by, for each of the nodes currently contained in the program tree, selecting the computational construct represented by the node, and displaying to a user a representation of the selected computational construct;
      receiving from the user an indication of an insertion point relative to the displayed representations of the computational constructs, the insertion point indicating a position within the program tree;
      receiving from the user an identification of a computational construct to be added to the computer program; and
      in response to receiving the identification of the computational construct, creating a node that represents the identified computational construct and adding the node to the program tree at the insertion point indicated by the user
   whereby the program tree contains a specification of the computer program.

2. The method of claim 1 wherein the user selects one of a plurality of display representation formats and the displayed representation of each computational construct is displayed in the selected display representation format.

3. The method of claim 2 wherein the selected display representation format is a C programming language representation.

4. The method of claim 2 wherein the selected display representation format is a Lisp programming language representation.

5. The method of claim 1 wherein each node representing a non-terminal computational construct contains a reference to a node representing a computational construct that is an operand of the non-terminal computational construct.

6. The method of claim 5 wherein when a node representing an non-terminal computational construct is added to the program tree and a node representing a computational construct that is an operand for the non-terminal computational construct is not currently contained in the program tree, automatically adding a node representing a computational construct that is the operand of the non-terminal computational construct.

7. A method in a computer program for displaying a computer program in a variety of representational formats, the computer program being represented by a program tree, the program tree being a tree data structure having nodes, each node representing a computational construct of the computer program, the method comprising:
   for each of a plurality of representational formats,
      receiving from a user an indication of the representational format; and
      for each of the nodes currently contained in the program tree,
         selecting the computational construct represented by the node; and
         displaying to the user a representation of the selected computational
   construct in the indicated representational format
   whereby the user can selectively display the computer program in each of the plurality representational formats.

8. The method of claim 7 wherein when the user selects a displayed representation of a displayed computational construct, selecting the node that represents the displayed computational construct and receiving from the user an indication that the selected node is to represent a different computational construct.

9. The method of claim 8 wherein the selected node contained in the program tree is modified to represent the different computational construct.

10. The method of claim 8 including redisplaying the representation of the computer program with a representation of the different computational construct.

11. The method of claim 7 wherein the representational formats include a C programming language format and a Pascal programming language format.

12. The method of claim 7 wherein a user selects a node of the program tree by selecting the displayed representations of the computational construct represented by the node.

13. A method in a computer system for specifying a computer program by direct manipulation of a program tree, the computer program being specified without using a programming language that has a grammar so that parsing of statements of the programming language according to the grammar is avoided, the method comprising:

receiving from a user data representing a plurality of nodes of a program tree representing the computer program and an indication of a position within the program tree for each node, the received data representing operation and operands that comprise the computer program;

storing the received data representing the plurality of nodes within a program tree data structure of the computer system at the indicated positions within the program tree, the nodes of the program tree data structure forming a tree data structure containing the specification of the computer program;

generating a display representation of the computer program in a display representational format from the data stored in the program tree data structure; and displaying the generated display representation on a display device of the computer system.

14. The method of claim 13 including selecting one of a plurality of display representational formats for use in generating the display representation.

15. The method of claim 13 wherein the receiving step includes the steps of:

positioning an insertion point within the program tree; and wherein the step of storing the received data includes inserting a node into the program tree data structure at a position corresponding to the positioned insertion point.

* * * * *